US012665425B2

(12) United States Patent
Hafner

(10) Patent No.: US 12,665,425 B2
(45) Date of Patent: Jun. 23, 2026

(54) PLUG-IN ENERGY STORAGE BATTERIES AND NETWORKED PLUG-IN ENERGY STORAGE BATTERIES

(71) Applicant: Eric Hafner, Queen Creek, AZ (US)

(72) Inventor: Eric Hafner, Queen Creek, AZ (US)

(73) Assignee: Eric Hafner, Queen Creek, AZ (US)

( * ) Notice: Subject to any disclaimer, the term of this patent is extended or adjusted under 35 U.S.C. 154(b) by 0 days.

(21) Appl. No.: 18/659,999

(22) Filed: May 9, 2024

(65) Prior Publication Data

US 2024/0291277 A1 Aug. 29, 2024

Related U.S. Application Data

(63) Continuation of application No. 17/517,529, filed on Nov. 2, 2021, now Pat. No. 12,003,106, which is a
(Continued)

(51) Int. Cl.
*H02J 3/32* (2026.01)
*G05B 15/02* (2006.01)
(Continued)

(52) U.S. Cl.
CPC ................ *H02J 3/32* (2013.01); *G05B 15/02* (2013.01); *H02J 7/865* (2026.01); *H01R 24/68* (2013.01);
(Continued)

(58) Field of Classification Search
CPC ...................................................... Y04S 20/222
(Continued)

(56) References Cited

U.S. PATENT DOCUMENTS

| | | | |
|---|---|---|---|
| 4,471,422 A | 9/1984 | Hierholzer | |
| 7,268,518 B1 | 9/2007 | Goff | |

(Continued)

FOREIGN PATENT DOCUMENTS

| | | |
|---|---|---|
| WO | 2018031595 | 2/2018 |
| WO | 2018085048 | 5/2018 |

OTHER PUBLICATIONS

Office Action dated Apr. 3, 2024 in Canadian Patent Application No. 3,060,531.
(Continued)

*Primary Examiner* — Edward Tso
*Assistant Examiner* — Ahmed H Omar
(74) *Attorney, Agent, or Firm* — Snell & Wilmer L.L.P.

(57) ABSTRACT

In an example embodiment, a battery unit comprises a battery unit housing; and a battery unit circuit. In this example embodiment, the battery unit housing contains at least a portion of the battery unit circuit, and the battery unit circuit further comprises: a battery cell, an inverter to control the charging and discharging of the battery cell, a processor to provide control signals to the inverter for controlling the charging and discharging of the battery cell, and one of: a power plug for coupling to and uncoupling from a power outlet assembly, and a luminaire base for coupling to and uncoupling from a luminaire socket in a light fixture. In this example embodiment, the battery unit is rated at less than or equal to 2400 Volt-Amperes. The battery unit may further comprise a transceiver.

20 Claims, 23 Drawing Sheets

Related U.S. Application Data continuation of application No. 16/657,256, filed on Oct. 18, 2019, now Pat. No. 11,233,415, which is a continuation of application No. 15/808,013, filed on Nov. 9, 2017, now Pat. No. 10,554,063, which is a continuation of application No. 15/787,183, filed on Oct. 18, 2017, now abandoned.

(60) Provisional application No. 62/553,642, filed on Sep. 1, 2017, provisional application No. 62/435,341, filed on Dec. 16, 2016, provisional application No. 62/416,152, filed on Nov. 1, 2016.

(51) Int. Cl.

| | |
|---|---|
| *H02J 7/00* | (2006.01) |
| *H01R 24/68* | (2011.01) |
| *H01R 24/76* | (2011.01) |
| *H01R 103/00* | (2006.01) |
| *H02J 3/14* | (2006.01) |
| *H02J 7/50* | (2026.01) |
| *H02J 105/55* | (2026.01) |

(52) U.S. Cl.
CPC .......... *H01R 24/76* (2013.01); *H01R 2103/00* (2013.01); *H02J 3/14* (2013.01); *H02J 7/585* (2026.01); *H02J 2105/55* (2026.01); *Y04S 20/222* (2013.01)

(58) Field of Classification Search
USPC ........................................................ 700/295
See application file for complete search history.

(56) References Cited

U.S. PATENT DOCUMENTS

| | | | |
|---|---|---|---|
| 8,872,379 | B2 | 10/2014 | Ruiz |
| 8,880,233 | B2 | 11/2014 | Kearns et al. |
| 9,800,050 | B2 | 10/2017 | Clifton |
| 10,637,246 | B2 | 4/2020 | Clifton |
| 2007/0229030 | A1 | 10/2007 | Chen et al. |
| 2009/0040029 | A1 | 2/2009 | Bridges et al. | |
| 2009/0322154 | A1* | 12/2009 | Ichikawa .............. B60W 10/26 307/82 |
| 2010/0141153 | A1 | 6/2010 | Recker et al. | |
| 2011/0202217 | A1* | 8/2011 | Kempton ........... G06Q 30/0601 320/109 |
| 2011/0304298 | A1 | 12/2011 | Gow et al. | |
| 2015/0380967 | A1* | 12/2015 | Toya ..................... H02J 7/0068 320/128 |
| 2016/0046199 | A1 | 2/2016 | Butler et al. | |
| 2018/0041072 | A1 | 2/2018 | Clifton et al. | |
| 2018/0205230 | A1 | 7/2018 | Kudo et al. | |
| 2020/0112200 | A1 | 4/2020 | Clifton et al. | |
| 2020/0161865 | A1 | 5/2020 | Clifton | |
| 2020/0161866 | A1 | 5/2020 | Clifton | |

OTHER PUBLICATIONS

The International Search Report and The Written Opinion of the International Searching Authority, International Application No. PCT/US17/57273 dated Jan. 26, 2018.

International Preliminary Report in Patentability in the International PCT Application No. PCT/US17/057273 issued on May 7, 2019.

USPTO Non Final Office Action dated May 3, 2018 in U.S. Appl. No. 15/808,013.

USPTO Non Final Office Action dated Feb. 21, 2019 in U.S. Appl. No. 15/808,013.

USPTO Notice of Allowance dated Sep. 23, 2019 in U.S. Appl. No. 15/808,013.

USPTO Non Final Office Action dated Sep. 3, 2020 in U.S. Appl. No. 16/657,256.

USPTO Final Office Action dated Jun. 11, 2021 in U.S. Appl. No. 16/657,256.

USPTO Notice of Allowance dated Sep. 15, 2021 in U.S. Appl. No. 16/657,256.

USPTO Non Final Office Action dated Aug. 3, 2023 in U.S. Appl. No. 17/517,529.

USPTO Final Office Action dated Nov. 24, 2023 in U.S. Appl. No. 17/517,529.

USPTO Notice of Allowance dated Jan. 31, 2024 in U.S. Appl. No. 17/517,529.

* cited by examiner

FIG. 6

PLUG-IN ENERGY STORAGE BATTERIES AND NETWORKED PLUG-IN ENERGY STORAGE BATTERIES

CROSS-REFERENCE TO RELATED APPLICATIONS

This application is a continuation of U.S. patent application Ser. No. 17/517,529, titled "PLUG-IN ENERGY STORAGE BATTERIES AND NETWORKED PLUG-IN ENERGY STORAGE BATTERIES," filed Nov. 2, 2021. Ser. No. 17/517,529 is a continuation of U.S. patent application Ser. No. 16/657,256, titled "PLUG-IN ENERGY STORAGE BATTERIES AND NETWORKED PLUG-IN ENERGY STORAGE BATTERIES," filed Oct. 18, 2019, now issued U.S. Pat. No. 11,233,415, issue date Jan. 25, 2022. Ser. No. 16/657,256 is a continuation of U.S. patent application Ser. No. 15/808,013, titled "PLUG-IN ENERGY STORAGE BATTERIES AND NETWORKED PLUG-IN ENERGY STORAGE BATTERIES," filed Nov. 9, 2017, now issued U.S. Pat. No. 10,554,063, issue date Feb. 4, 2020. Ser. No. 15/808,013 is a continuation of U.S. patent application Ser. No. 15/787,183, titled "PLUG-IN ENERGY STORAGE BATTERIES AND NETWORKED PLUG-IN ENERGY STORAGE BATTERIES," filed Oct. 18, 2017. The Ser. No. 15/787,183 application claims priority to U.S. Provisional Patent Application No. 62/416,152, titled "ENERGY STORAGE BATTERIES" filed Nov. 1, 2016, U.S. Provisional Patent Application No. 62/435,341, titled "ENERGY STORAGE BATTERIES" filed Dec. 16, 2016, and U.S. Provisional Patent Application No. 62/553,642, titled "ENERGY STORAGE BATTERIES" filed Sep. 1, 2017, which are fully incorporated herein by reference for any reason.

FIELD OF THE INVENTION

This disclosure relates generally to batteries for charging and discharging. More specifically, this disclosure relates to energy storage devices for readily plugging into wall outlets and for use as light fixtures.

BACKGROUND OF THE INVENTION

Most buildings include an electrical system that provides power for electrical devices through the distribution of electrical conductors throughout and ending in outlets for such things as lighting and convenience receptacles. It is well known in the industry that the cost to produce and the price to purchase energy varies throughout the day. It is desirable to store this energy when it is less expensive, and to use this stored energy when it is more expensive. In this way, the cost of using the energy is reduced.

BRIEF SUMMARY OF THE INVENTION

The present disclosure is directed to a distributed and coordinated group of energy storage batteries, which store energy when it is less expensive, and discharge the stored energy when it is more expensive or required. The present disclosure is also directed to a method of coordinating the charge and discharge of the energy of the storage batteries. These and other features, aspects and advantages of the present invention will be best understood from the following description, when read in conjunction with the accompanying drawings and appending claims.

In an example embodiment, a battery unit comprises a battery unit housing; and a battery unit circuit. In this example embodiment, the battery unit housing contains at least a portion of the battery unit circuit, and the battery unit circuit further comprises: a battery cell, an inverter to control the charging and discharging of the battery cell, a processor to provide control signals to the inverter for controlling the charging and discharging of the battery cell, and one of: a power plug for coupling to and uncoupling from a power outlet assembly, and a luminaire base for coupling to and uncoupling from a luminaire socket in a light fixture. In this example embodiment, the battery unit is rated at less than or equal to 2400 Volt-Amperes.

In another example embodiment, a battery unit network comprises: a first battery unit and a second battery unit. In this example embodiment, the first battery unit and the second battery unit each comprises: a battery unit housing, a battery unit circuit, wherein the battery unit housing contains at least a portion of the battery unit circuit. The battery unit circuit further comprises: a battery cell, an inverter to control the charging and discharging of the battery cell, a processor to provide inverter control signals to the inverter for controlling the charging and discharging of the battery cell, and a transceiver to provide processor signals to the processor, wherein the inverter control signals are at least partially based on the processor signals. The battery unit circuit further comprises one of: a power plug for coupling to and uncoupling from a power outlet assembly, and a luminaire base for coupling to and uncoupling from a luminaire socket in a light fixture. In an example embodiment, the first battery unit and the second battery unit are each rated at less than or equal to 2400 Volt-Amperes. In an example embodiment, the first battery unit stores a first amount of energy and the second battery unit stores a second amount of energy. In this example embodiment, the first battery unit wirelessly receives first $S_{Control}$ signals, wherein the control of the charging or discharging of the first battery unit is based on the first $S_{Control}$ signals. And in this example embodiment, the second battery unit wirelessly receives second $S_{Control}$ signals, wherein the control of the charging or discharging of the second battery unit is based on the second $S_{Control}$ signals.

BRIEF DESCRIPTION OF THE DRAWINGS

It should be noted that like reference characters are used throughout the various views of the Drawings:

FIG. 6 is a block diagram of a second portion of the battery unit circuit of FIG. 5.

DETAILED DESCRIPTION OF THE INVENTION

While exemplary embodiments are described herein in sufficient detail to enable those skilled in the art to practice the invention, it should be understood that other embodiments may be realized and that logical material, electrical, and mechanical changes may be made without departing from the spirit and scope of the invention. Thus, the following detailed description is presented for purposes of illustration only.

In an example embodiment, a battery unit comprises a battery unit housing; and a battery unit circuit. In this example embodiment, the battery unit housing contains at least a portion of the battery unit circuit, and the battery unit circuit further comprises: a battery cell, an inverter to control the charging and discharging of the battery cell, a processor to provide control signals to the inverter for controlling the charging and discharging of the battery cell, and one of: a power plug for coupling to and uncoupling from a power outlet assembly, and a luminaire base for coupling to and uncoupling from a luminaire socket in a light fixture. In this example embodiment, the battery unit is rated at less than or equal to 2400 Volt-Amperes.

Figure 1:
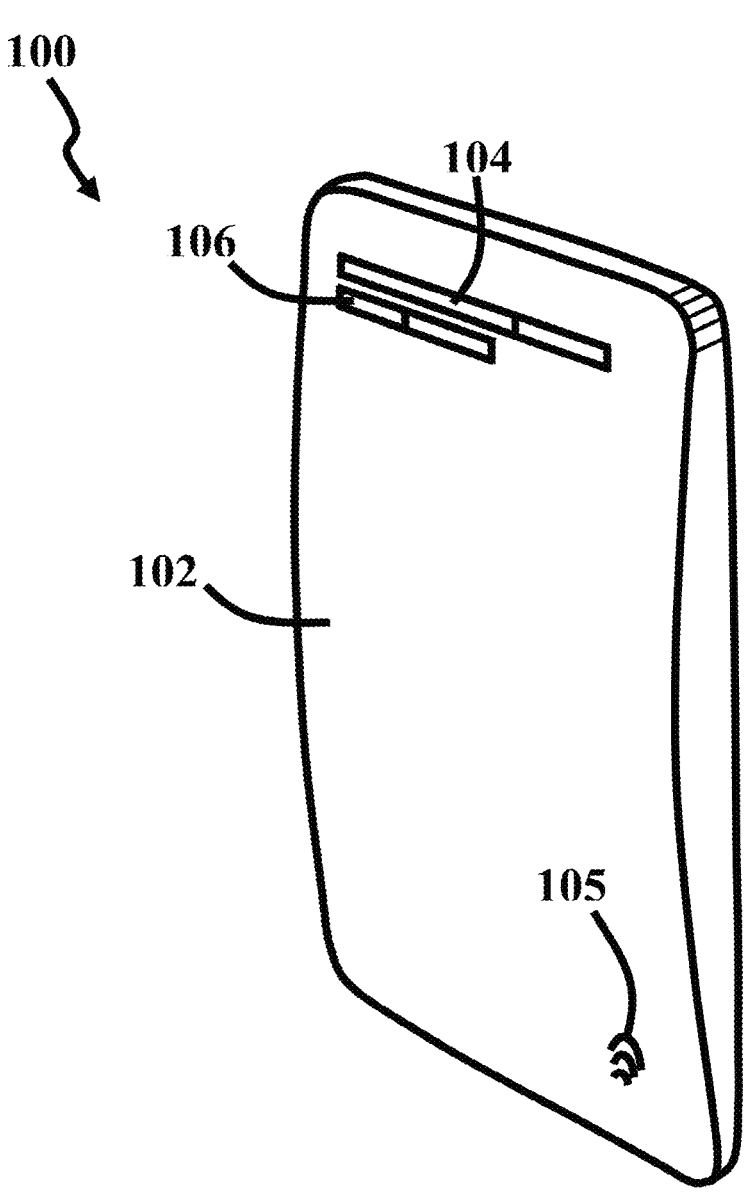
FIGS. 1 and 2 are front and back perspective views, respectively, of a battery unit.
Figure 2:
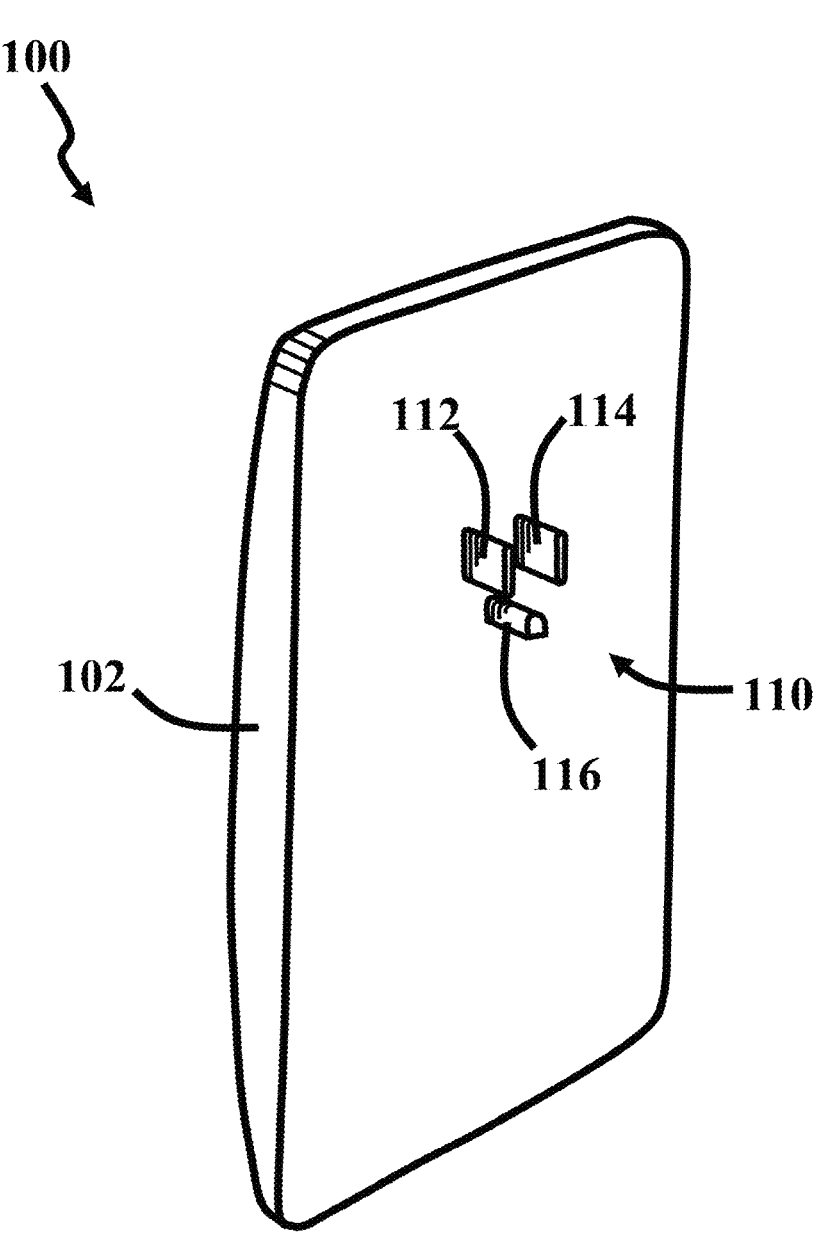

FIGS. 1 and 2 are front and back perspective views, respectively, of a battery unit 100. As will be discussed in more detail below with FIG. 5, the battery unit 100 includes a battery unit circuit. The battery unit circuit controls the operation of the battery unit 100.

In this embodiment, the battery unit 100 includes a battery unit housing 102. The battery unit housing 102 houses the various components of the battery unit 100. For example, the battery unit housing 102 houses the battery unit circuit. The battery unit housing 102 carries some of the components of the battery unit 100, as will be discussed in more detail presently.

In this embodiment, the battery unit 100 includes a battery unit power indicator 104, which is carried by the battery unit housing 102. The battery unit power indicator 104 provides an indication of the amount of power stored by the battery unit 100. In operation, the battery unit power indicator 104 moves light in a first direction in response to the power stored by the battery unit 100 increasing. Further, in operation, the battery unit power indicator 104 moves light in a second direction in response to the power stored by the battery unit 100 decreasing. In an example embodiment, the battery unit power indicator 104 includes one or more lights to provide an indication of the amount of power storage. The lights can be of many different types such as light emitting diodes. The lights can be of many different colors, such as red, yellow, and/or green. Moreover, any suitable indicator or method of indicating the amount of power stored in the battery unit may be used. In other example embodiments, no visible indicators of the amount of power stored in the battery unit are provided on the battery unit 100.

In this embodiment, the battery unit 100 includes a wireless connection indicator 105, which is carried by the battery unit housing 102. The wireless connection indicator 105 provides an indication of the amount of wireless connection power received by the battery unit 100. The wireless connection power corresponds to the strength of a wireless signal that flows between the battery unit 100 and another device. The other device can be of many different types, as will be discussed in more detail below with FIGS. 12, 13, 14, and 15.

In operation, the wireless connection indicator 105 moves light in a third direction in response to the wireless connection power received by the battery unit 100 increasing. Further, in operation, the wireless connection indicator 105 moves light in a fourth direction in response to the wireless connection power received by the battery unit 100 decreasing. The wireless connection indicator 105 can include one or more lights to provide an indication of the amount of power storage. The lights can be of many different types such as light emitting diodes. The lights can be of many different colors, such as red, yellow, and/or green. Moreover, any suitable indicator or method of indicating the strength of the wireless signal received by the battery unit may be used. In other example embodiments, no visible indicators of the strength of the wireless signal are provided on the battery unit 100.

In this embodiment, the battery unit 100 includes a charge/discharge indicator 106, which is carried by the battery unit housing 102. The charge/discharge indicator 106 provides an indication of the charge state of the battery unit 100. The charge/discharge indicator 106 can be of many different types of indicators, such as a light. The light can be of many different types such as a light emitting diode. Moreover, any suitable indicator or method of indicating the state of the battery unit may be used. In other example embodiments, no visible indicators of the state of the battery unit are provided on the battery unit 100.

In operation, the charge/discharge indicator 106 has a first charge state indication in response to the battery unit 100 being charged. The first charge state indication can be of many different types of indications, such as a light color indication. The light color indication can be of many different colors, such as green.

In operation, the charge/discharge indicator 106 has a second charge state indication in response to the battery unit 100 being discharged. The second charge state indication can be of many different types of indications, such as a light color indication. The light color indication can be of many different colors, such as red. It should be noted that other colors, such as blue and yellow, can also be used to indicate the first and second charge states.

In an example embodiment, the battery unit 100 includes a power plug 110. The power plug 110 can be of many different types. In this embodiment, the power plug 110 is a three-prong power plug, which includes a positive power prong 112, neutral power prong 114, and current return prong 116. In this embodiment, the power plug 110 is rated for 120 volts, so it is a 120 volt power plug. It should be noted that 120 volt power plugs are common in the United States. However, the power plug 110 can be rated for other voltages and the prongs can be configured for other power outlet configurations standard in other countries. For example, the power plug 110 can be rated for other voltages that are used in other countries.

Figure 3:
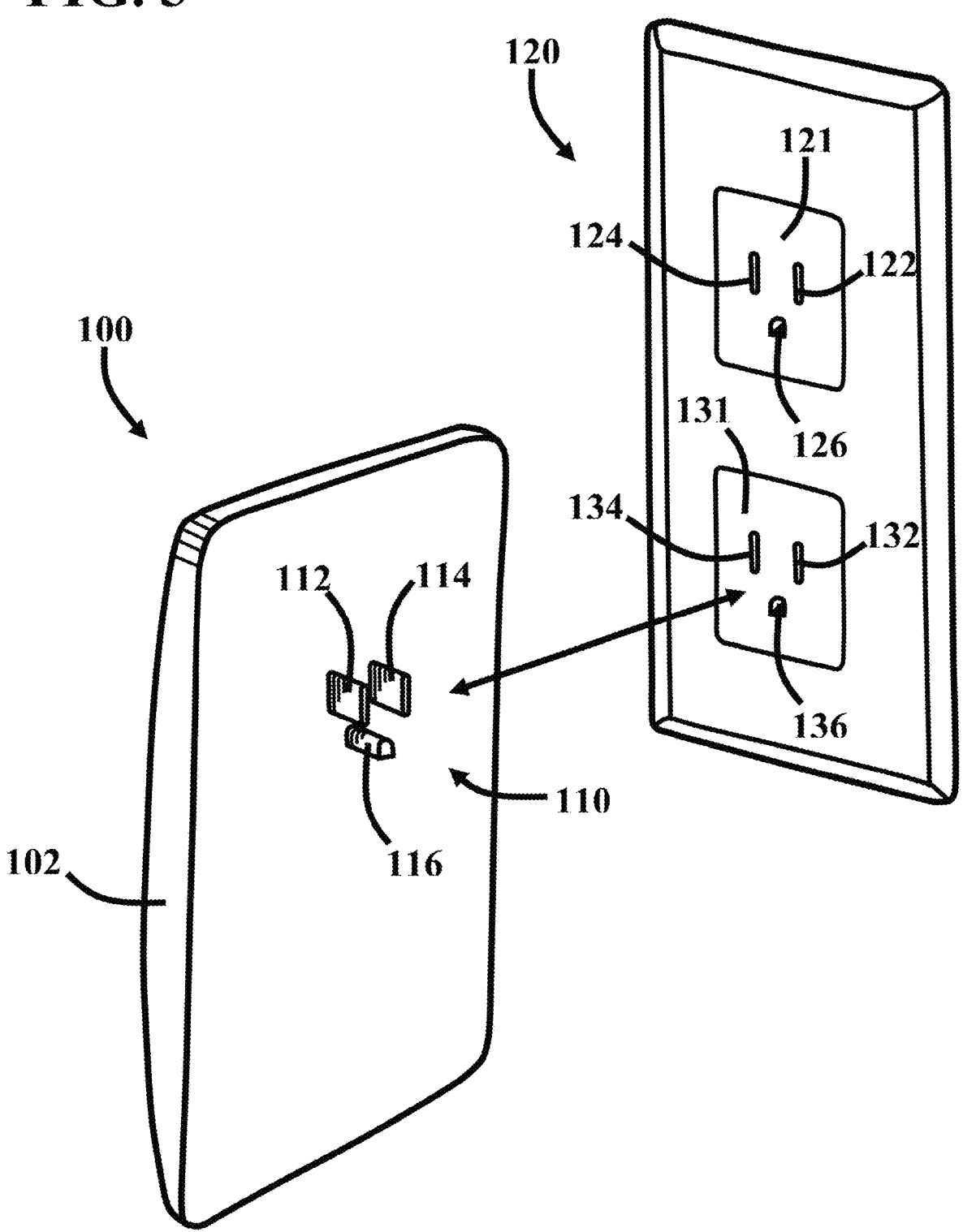
FIGS. 3 and 4 are perspective views of the battery unit of FIGS. 1 and 2 in uncoupled and coupled positions with a power outlet assembly.
Figure 4:
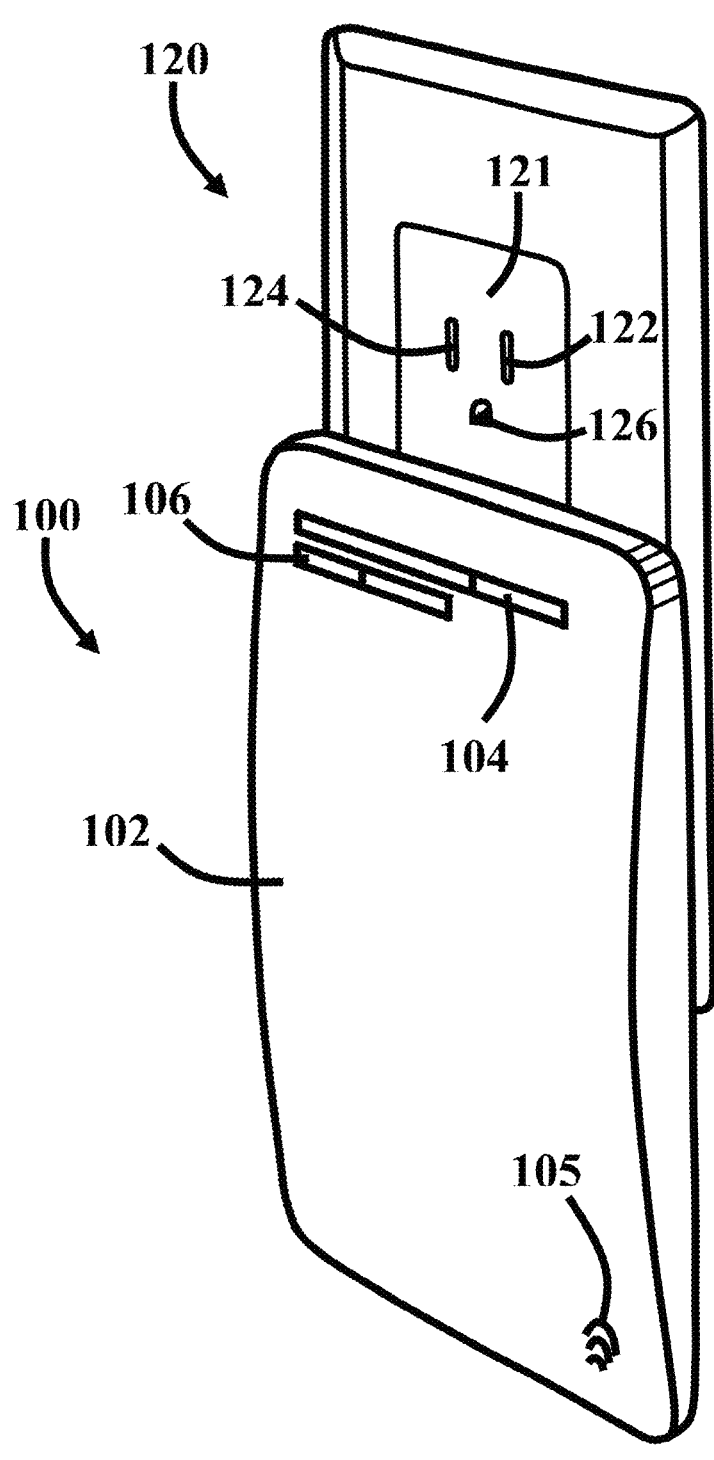

FIGS. 3 and 4 are perspective views of the battery unit 100 of FIGS. 1 and 2 in uncoupled and coupled positions with a power outlet assembly 120. The battery unit 100 can receive power from the power outlet assembly 120 when it is coupled thereto. The battery unit 100 does not receive power from the power outlet assembly 120 when it is uncoupled therefrom. Further, the battery unit 100 can provide power to the power outlet assembly 120 when it is coupled thereto. The battery unit 100 does not provide power to the power outlet assembly 120 when it is uncoupled therefrom.

In this embodiment, the power outlet assembly 120 includes a power outlet 121. The power outlet 121 can be of many different types. In this embodiment, the power outlet 121 is a three-slot power outlet, which includes a positive power slot 122, neutral power slot 124, and current return slot 126. In this embodiment, the power outlet 121 is rated for 120 volts, so it is a 120 volt power outlet. It should be noted that 120 volt power outlets are common in the United States. However, the power outlet 121 can be rated for other voltages. For example, the power outlet 121 can be rated for other voltages that are used in other countries.

In this embodiment, the power outlet assembly 120 includes a power outlet 131. The power outlet 131 can be of many different types. In this embodiment, the power outlet 131 is a three-slot power outlet, which includes a positive power slot 132, neutral power slot 134, and current return slot 136. In this embodiment, the power outlet 131 is rated for 120 volts, so it is a 120 volt power outlet. It should be noted that 120 volt power outlets are common in the United States. However, the power outlet 131 can be rated for other voltages. For example, the power outlet 131 can be rated for other voltages that are used in other countries.

It should be noted that the power outlet assembly 120 includes two power outlets in this embodiment for illustrative purposes. In general, the power outlet assembly 120 can include one or more power outlets.

The battery unit 100 is repeatably moveable between the uncoupled and coupled positions with the power outlet assembly 120. The battery unit 100 can be coupled to the power outlet assembly 120 in many different ways. For example, the battery unit 100 can be coupled to the power outlet 121 in response to coupling the power plug 110 thereto. The power plug 110 is coupled to the power outlet 121 in response to moving the positive power prong 112 into the positive power slot 122, the neutral power prong 114 into the neutral power slot 124, and the current return prong 116 into the current return slot 126. This is also referred to as plugging in the power plug 110, or the power plug 110 being plugged into the power outlet 121.

The battery unit 100 can receive power from the power outlet 121 when the power plug 110 is coupled thereto. The battery unit 100 does not receive power from the power outlet 121 when the power plug 110 is uncoupled therefrom.

Further, the battery unit 100 can provide power to the power outlet 121 when the power plug 110 is coupled thereto. The battery unit 100 does not provide power to the power outlet 121 when the power plug 110 is uncoupled therefrom.

In FIGS. 3 and 4, however, the battery unit 100 is coupled to the power outlet 131 in response to coupling the power plug 110 thereto. The power plug 110 is coupled to the power outlet 131 in response to moving the positive power prong 112 into the positive power slot 132, the neutral power prong 114 into the neutral power slot 134, and the current return prong 116 into the current return slot 136.

The battery unit 100 can receive power from the power outlet 131 when the power plug 110 is coupled thereto. The battery unit 100 does not receive power from the power outlet 131 when the power plug 110 is uncoupled therefrom. Further, the battery unit 100 can provide power to the power outlet 131 when the power plug 110 is coupled thereto. The battery unit 100 does not provide power to the power outlet 131 when the power plug 110 is uncoupled therefrom. Moreover, the battery unit 100, in an example embodiment, can be coupled to more than one power outlet (e.g., 121 and 131) at the same time through use of corresponding power plugs.

In an example embodiment, the battery unit power indicator 104 provides an indication of the amount of power stored by the battery unit 100. As mentioned above, the battery unit power indicator 104 moves light in the first direction in response to the power stored by the battery unit 100 increasing. In this embodiment, the battery unit power indicator 104 moves light in the first direction in response to the power flowing from the power outlet 131 to the battery unit 100 through the power plug 110. In this way, the power stored by the battery unit 100 increases.

As mentioned above, the battery unit power indicator 104 moves light in the second direction in response to the power stored by the battery unit 100 decreasing. In this embodiment, the battery unit power indicator 104 moves light in the second direction in response to the power flowing from the battery unit 100 to the power outlet 131 through the power plug 110. In this way, the power stored by the battery unit 100 decreases.

As mentioned above, the charge/discharge indicator 106 provides an indication of the charge state of the battery unit 100. In operation, the charge/discharge indicator 106 has the first charge state indication in response to the power plug 110 being coupled to the power outlet 131. Further, in operation, the charge/discharge indicator 106 has the second charge state indication in response to the power plug 110 being uncoupled from the power outlet 131.

In this embodiment, the wireless connection indicator 105 provides an indication of the amount of wireless connection power received by the battery unit 100. The wireless connection indicator 105 moves light in the third direction in response to the wireless connection power received by the battery unit 100 increasing. The wireless connection indicator 105 moves light in the fourth direction in response to the wireless connection power received by the battery unit 100 decreasing. As mentioned above, the wireless connection power corresponds to the strength of a wireless signal that flows between the battery unit 100 and another device. The other device can be of many different types, as will be discussed in more detail below with FIGS. 12, 13, 14, and 15.

Figure 5:
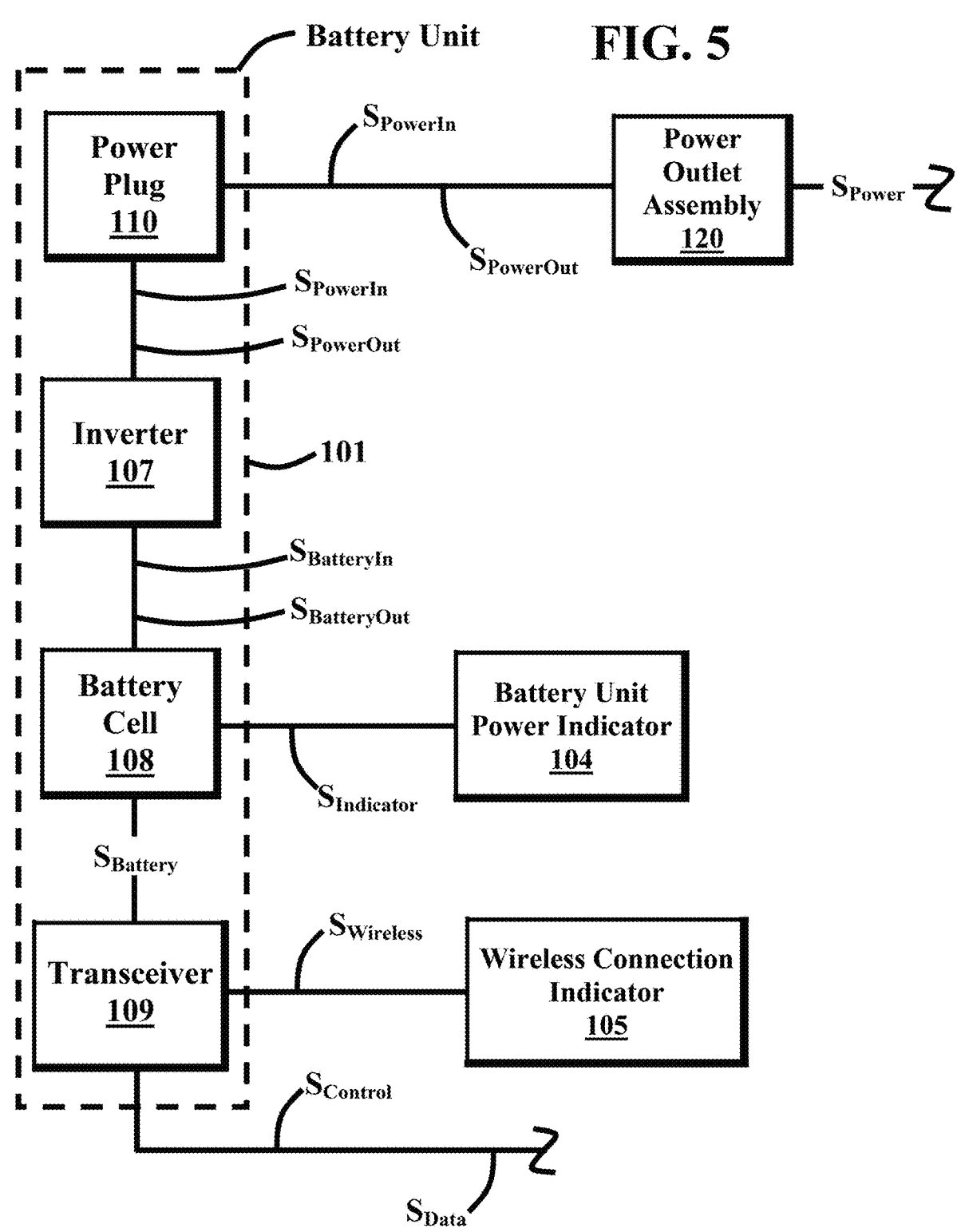
FIG. 5 is a block diagram of a first portion of a battery unit circuit, which is included with the battery unit of FIGS. 1 and 2.
Figure 6:
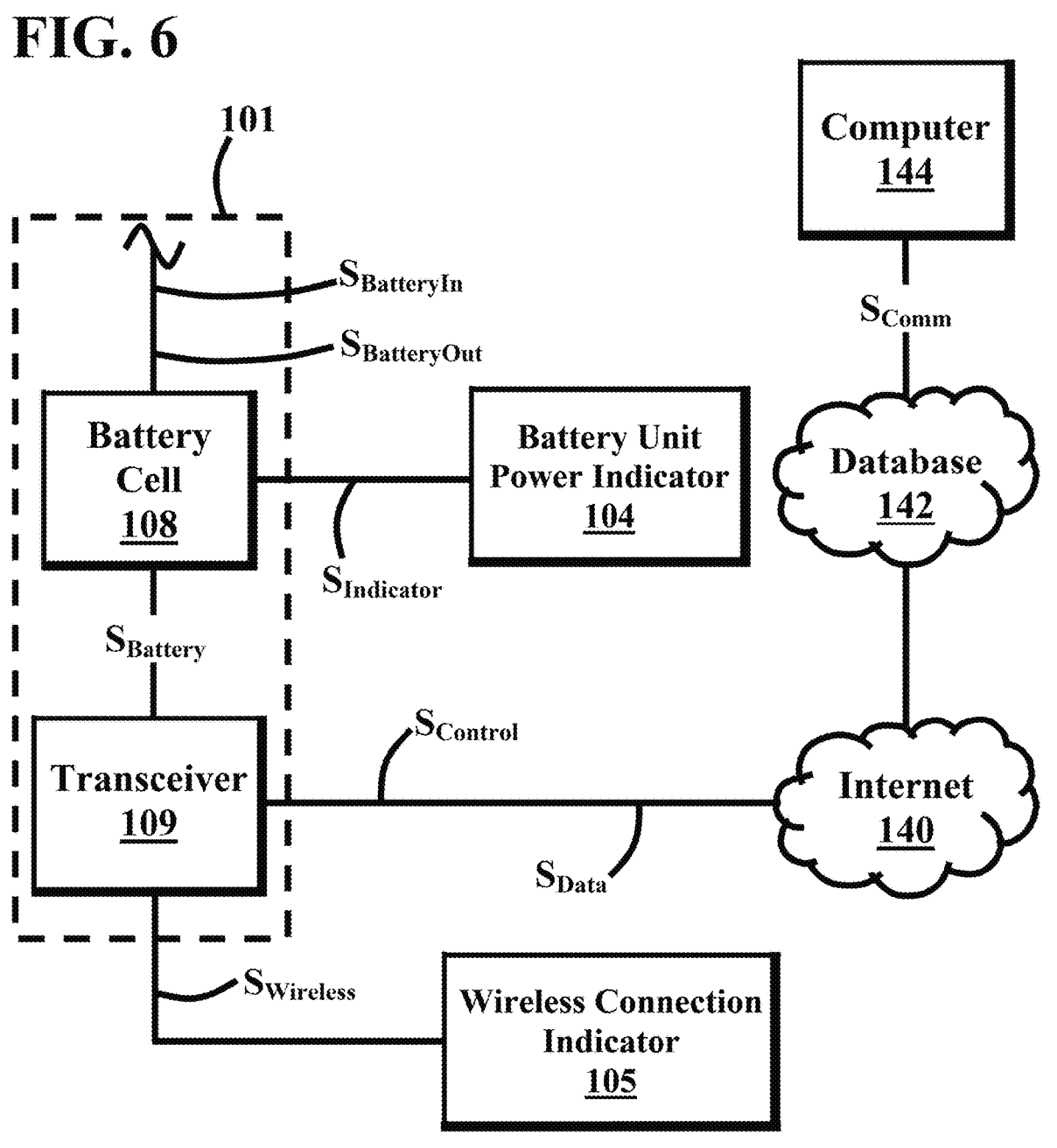

FIG. 5 is a block diagram of a first portion of a battery unit circuit 101, which is included with the battery unit 100 of FIGS. 1 and 2, and FIG. 6 is a block diagram of a second portion of the battery unit circuit 101 of FIG. 5. It should be noted that the battery unit circuit 101 allows energy to be distributed, in a controlled manner, to other electrical devices through the electrical distribution system.

In this embodiment, the battery unit circuit 101 includes the power plug 110, which is described above. The power plug 110 is carried by the battery unit housing 102, as shown in FIGS. 2 and 3. As discussed in more detail above, the power plug 110 is repeatably moveable between coupled and uncoupled positions with the power outlet assembly 120. In the coupled condition, a power in signal $S_{PowerIn}$ can be received by the power plug 110 from the power outlet assembly 120. Further, in the coupled condition, a power out signal $S_{PowerOut}$ can be received by the power outlet assembly 120 from the power plug 110. It should be noted that the power in signal $S_{PowerIn}$ is a portion of a power signal $S_{Power}$ that is provided to the power outlet assembly 120 and the power out signal $S_{PowerOut}$ is another portion of the power signal $S_{Power}$. The power signal $S_{Power}$ can be provided to the power outlet assembly 120 in many different ways, such as from a service panel (not shown). The service panel is connected to the power outlet assembly 120 through an electrical distribution system. It should be noted that, in this embodiment, the power in $S_{PowerIn}$, power out $S_{PowerOut}$, and power $S_{Power}$ signals are alternating current power signals.

The battery unit circuit 101 includes an inverter 107, which is coupled to the power plug 110. The inverter 107 can be of many different types. In this embodiment, the inverter 107 converts power signals between alternating current and direct current power signals. In this embodiment, the inverter 107 receives the power in signal $S_{PowerIn}$ from the power plug 110, and provides a battery in signal $S_{BatteryIn}$ in response. The battery in signal $S_{BatteryIn}$ is a direct current power signal that corresponds to the alternating current power in signal $S_{PowerIn}$. Further, the inverter 107 receives a battery out signal $S_{BatteryOut}$, and provides the power out signal $S_{PowerOut}$ in response. The power out signal $S_{PowerOut}$ is an alternating current power signal that corresponds to the direct current battery out signal $S_{BatteryOut}$.

The battery unit circuit 101 includes a battery cell 108 coupled to the inverter 107. The battery cell 108 can be of many different types. In this embodiment, the battery cell 108 is a lithium-ion battery cell. The battery cell 108 provides the battery out signal $S_{BatteryOut}$ to the inverter 107. Further, the battery cell 108 receives the battery in signal $S_{BatteryIn}$ from the inverter 107.

In this embodiment, the battery unit circuit 101 includes the battery unit power indicator 104, which is operatively coupled to the battery cell 108. The battery unit power indicator 104 is shown in FIGS. 1 and 4. In operation, the battery unit power indicator 104 moves light in the first direction in response to receiving the battery in signal $S_{BatteryIn}$. Further, in operation, the battery unit power indicator 104 moves light in the second direction in response to providing the battery out signal $S_{BatteryOut}$.

The battery unit circuit 101 includes a transceiver 109 coupled to the battery cell 108. The transceiver 109 can be of many different types, such as a Wi-Fi radio or other mesh network transceiver that allows communication and control wirelessly. The transceiver 109 may communicate, for example, with a wireless router in the building. The transceiver 109 is powered in response to receiving a battery signal $S_{Battery}$ from the battery cell 108, wherein the battery signal $S_{Battery}$ is a direct current power signal. It should be noted that the battery signal $S_{Battery}$ can be used to power other components of the battery unit circuit 101, if desired.

In this embodiment, the battery unit circuit 101 includes the wireless connection indicator 105, which is operatively coupled to the transceiver 109. The wireless connection indicator 105 is shown in FIGS. 1 and 4. As mentioned above, the wireless connection indicator 105 provides an indication of the amount of wireless connection power received by the battery unit 100. In particular, the wireless connection indicator 105 provides an indication of the amount of wireless connection power received by the transceiver 109. The wireless connection power corresponds to the strength of a wireless signal that flows between the battery unit 100 and another device. In particular, the wireless connection power corresponds to the strength of a wireless signal that flows between the transceiver 109 and another device. The other device can be of many different types, as will be discussed in more detail below with FIGS. 12, 13, 14, and 15.

In operation, the wireless connection indicator 105 moves light in the third direction in response to the wireless connection power received by the transceiver 109 increasing. Further, in operation, the wireless connection indicator 105 moves light in the fourth direction in response to the wireless connection power received by the transceiver 109 decreasing. The wireless connection power can correspond to the power of many different types of wireless signals. In this embodiment, the wireless connection power corresponds to the power of a control signal $S_{Control}$ and/or data signal $S_{Data}$. In other embodiments, such as those discussed with FIGS. 12, 13, 14, and 15 below, the wireless connection power corresponds to one or more wireless signals $S_1$, $S_2$, and $S_3$.

As shown in FIG. 6, the control signal $S_{Control}$ and data signal $S_{Data}$ flow between the transceiver 109 and internet 140. It should be noted that the internet 140 typically includes one or more computer networks. The computer network can be of many different types, such as a wide area network (WAN) and local area network (LAN).

In this embodiment, the internet 140 is in communication with a database 142, which is used for data logging, billing, and prediction of future charge and discharge patterns of the user based on past consumption locally or remotely. The database 142 can be accessed remotely via a web portal via computer 144. In an example embodiment, access to the database 142 and communication via the internet 140 is intermittent and on demand.

In this embodiment, the database 142 is in communication with a computer 144. The computer 144 can be of many different types, such as a server, which operates a web-based portal or web-based interface. The computer 144 can also be a mobile device, such as a smart phone and tablet. Examples of smart phones include the IPHONE and ANDROID devices, and an example of a tablet is an IPAD. In an example embodiment, not shown, computer 144 is in direct communication with internet 140.

Figure 7:
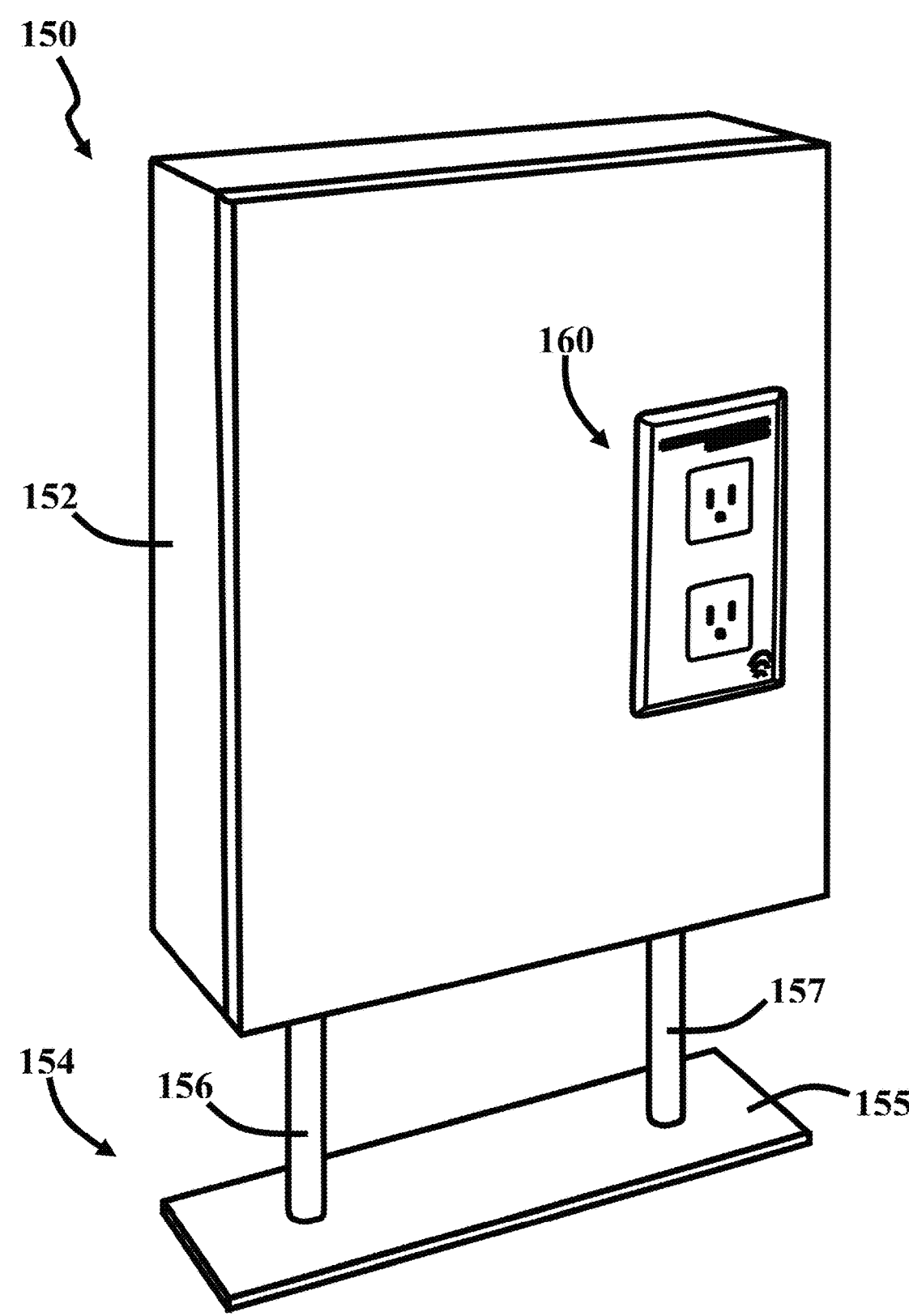
FIG. 7 is a perspective view of another embodiment of a battery unit.

FIG. 7 is a perspective view of another embodiment of a battery unit 150. As will be discussed in more detail below with FIG. 10, the battery unit 150 includes a battery unit circuit. The battery unit circuit controls the operation of the battery unit 150.

In this embodiment, the battery unit 150 includes a battery unit housing 152. The battery unit housing 152 houses the various components of the battery unit 150. For example, the battery unit housing 152 houses the battery unit circuit. The battery unit housing 152 carries some of the components of the battery unit 150, as will be discussed in more detail below.

In this embodiment, the battery unit 150 includes a power outlet assembly 160, which is carried by the battery unit housing 152. The power outlet assembly 160 will be discussed in more detail with FIG. 9.

In this embodiment, the battery unit 150 includes a battery unit stand 154, which is coupled to the battery unit housing 152. The battery unit stand 154 can be of many different types. In this embodiment, the battery unit stand 154 includes a battery unit platform 155, which is spaced from the battery unit housing 152 by battery unit legs 156 and 157. The battery unit stand 154 allows the battery unit 150 to be positioned at a desired location, as will be discussed in more detail presently. The battery unit stand 154 also allows the battery unit housing 152 to be held at a desired position so that insulation can be positioned around it. Further, the battery unit stand 154 allows the power outlet assembly 160 to be positioned at a desired location, such as a desired height above a floor.

Figure 8:
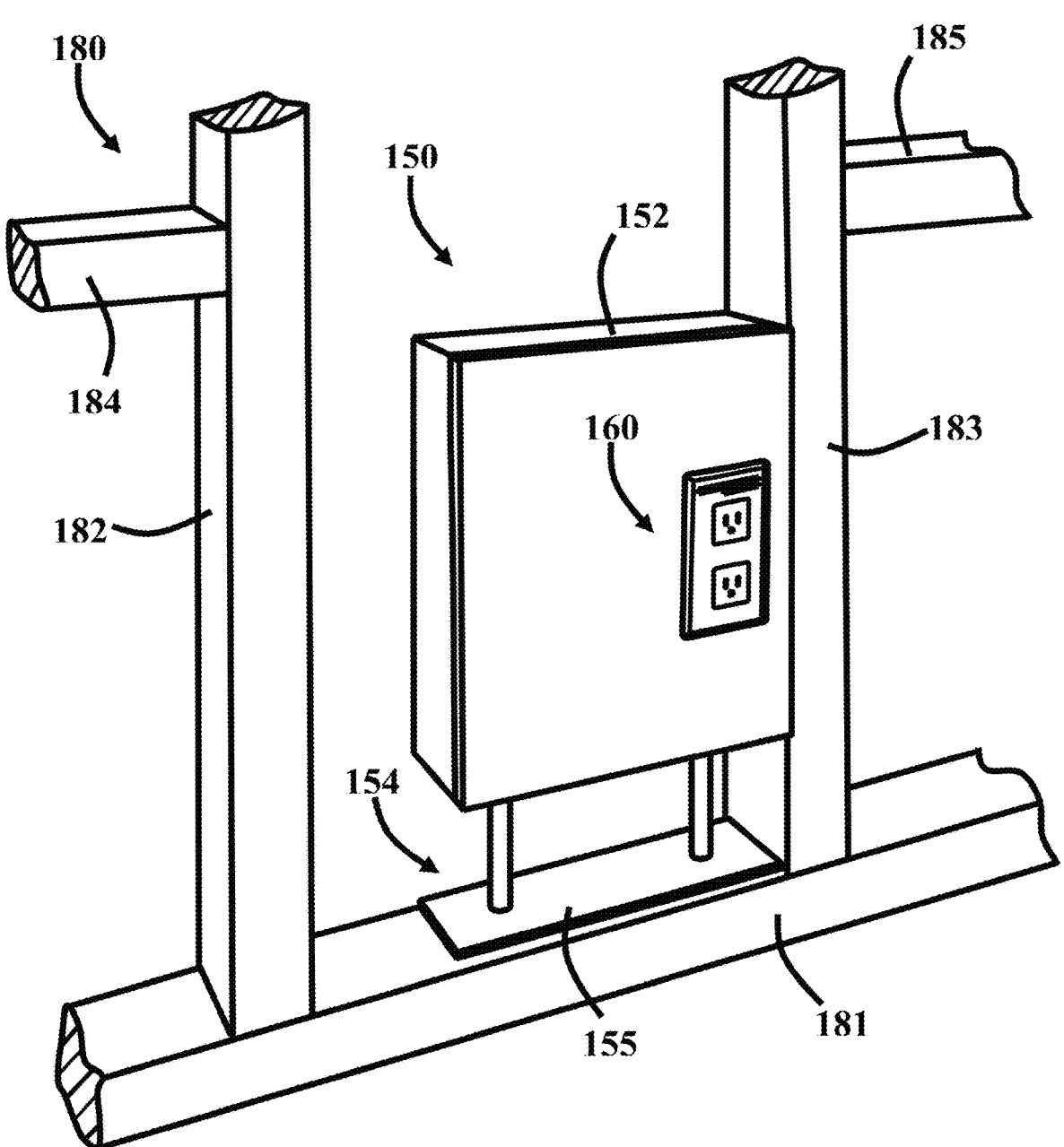
FIG. 8 is a perspective view of the battery unit of FIG. 7 and a frame.

FIG. 8 is a perspective view of the battery unit 150 of FIG. 7 and a frame 180. The frame 180 can be of many different types. In this embodiment, the frame 180 corresponds to the framing of a wall, which generally includes one or more beams. In this embodiment, the frame 180 includes a lower cross beam 181, wherein the battery unit stand 154 is carried by the lower cross beam 181. The frame 180 includes upright beams 182 and 183, wherein the battery unit 150 extends therebetween. The frame 180 can include other beams, such as upper cross beams 184 and 185, wherein upper cross beams 184 and 185 extend away from upright beams 182 and 183, respectively.

It should be noted that a wall member, such as drywall, is typically carried by the frame 180. In one particular embodiment, first and second wall members are positioned on opposed sides of the frame 180 so that the battery unit 150 is positioned therebetween. In this way, the battery unit 150 can be positioned relative to a wall. In some embodiments, the battery unit 150 is positioned inside of the wall. The battery unit housing 152 can be positioned between opposed wall members, and the power outlet assembly 160 can extend through one of the wall members, as will be discussed in more detail presently.

Figure 9:
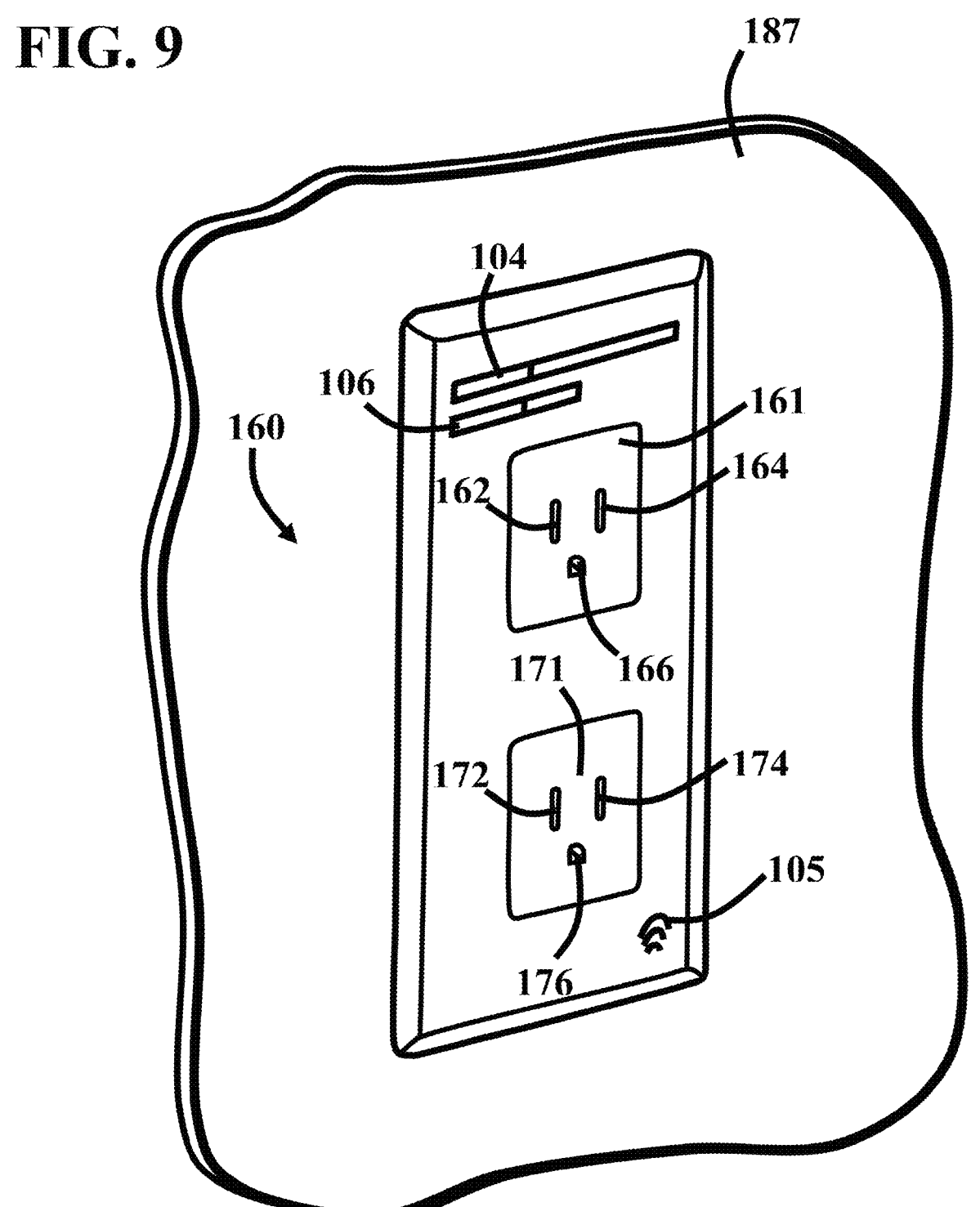
FIG. 9 is a close-up perspective view of a power outlet assembly included with the battery unit of FIG. 7.

FIG. 9 is a close-up perspective view of the power outlet assembly 160 included with the battery unit 150 of FIGS. 7 and 8. As mentioned above, the power outlet assembly 160 is carried by the battery unit housing 152. In this embodiment, the power outlet assembly 160 extends proximate to a wall member 187, wherein the wall member 187 is carried by the frame 180 (FIG. 8).

The power outlet assembly 160 can be of many different types. In this embodiment, the power outlet assembly 160 includes a power outlet 161. The power outlet 161 can be of many different types. In this embodiment, the power outlet 161 is a three-slot power outlet, which includes a positive power slot 162, neutral power slot 164, and current return slot 166. In this embodiment, the power outlet 161 is rated for 120 volts, so it is a 120 volt power outlet. As mentioned above, 120 volt power outlets are common in the United States. However, the power outlet 161 can be rated for other voltages. For example, the power outlet 161 can be rated for other voltages that are used in other countries.

In this embodiment, the power outlet assembly 160 includes a power outlet 171. The power outlet 171 can be of many different types. In this embodiment, the power outlet 171 is a three-slot power outlet, which includes a positive power slot 172, neutral power slot 174, and current return slot 176. In this embodiment, the power outlet 171 is rated for 120 volts, so it is a 120 volt power outlet. As mentioned above, 120 volt power outlets are common in the United States. However, the power outlet 171 can be rated for other voltages. For example, the power outlet 171 can be rated for other voltages that are used in other countries.

It should be noted that the power outlet assembly 160 includes two power outlets in this embodiment for illustrative purposes. In general, the power outlet assembly 160 can include one or more power outlets.

In this embodiment, the power outlet assembly 160 includes a battery unit power indicator 104. As mentioned above, the battery unit power indicator 104 provides an indication of the amount of power stored by the battery unit 150. In operation, the battery unit power indicator 104 moves in the first direction in response to the power stored by the battery unit 150 increasing. Further, in operation, the battery unit power indicator 104 moves in the second direction in response to the power stored by the battery unit 150 decreasing. More information regarding the battery unit power indicator 104 is provided above.

In this embodiment, the power outlet assembly 160 includes the wireless connection indicator 105. The wireless connection indicator 105 provides an indication of the amount of wireless connection power received by the battery unit 150. The wireless connection power corresponds to the strength of a wireless signal that flows between the battery unit 150 and another device. The other device can be of many different types, as will be discussed in more detail below with FIGS. 10, 11, 12, and 13.

In operation, the wireless connection indicator 105 moves in the third direction in response to the wireless connection power received by the battery unit 150 increasing. Further, in operation, the wireless connection indicator 105 moves in the fourth direction in response to the wireless connection power received by the battery unit 150 decreasing. The wireless connection indicator 105 can include one or more lights to provide an indication of the amount of power storage. The lights can be of many different types such as light emitting diodes. The lights can be of many different colors, such as red, yellow, and/or green.

In this embodiment, the power outlet assembly 160 includes the charge/discharge indicator 106. The charge/discharge indicator 106 provides an indication of the charge state of the battery unit 150. As mentioned above, the charge/discharge indicator 106 can be of many different types of indicators, such as a light. The light can be of many different types such as a light emitting diode.

In operation, the charge/discharge indicator 106 has the first charge state indication in response to the battery unit 100 being charged. As mentioned above, the first charge state indication can be of many different types of indications, such as a light color indication. The light color indication can be of many different colors, such as green.

In operation, the charge/discharge indicator 106 has the second charge state indication in response to the battery unit 100 being discharged. As mentioned above, the second charge state indication can be of many different types of indications, such as a light color indication. The light color indication can be of many different colors, such as red. It should be noted that other colors, such as blue and yellow, can also be used to indicate the first and second charge states.

Figure 10:
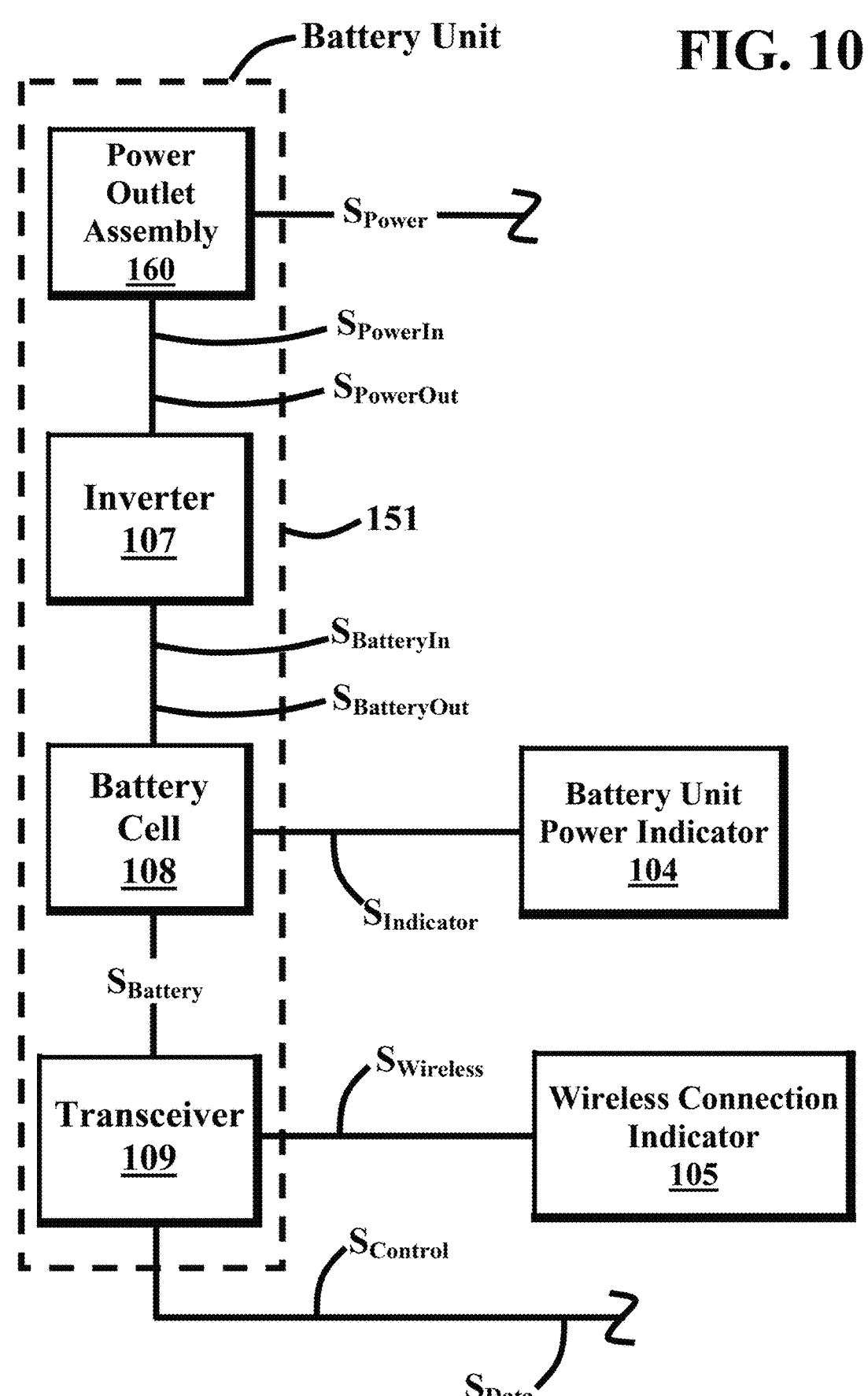
FIG. 10 is a block diagram of a first portion of a battery unit circuit, which is included with the battery unit of FIG. 7.

FIG. 10 is a block diagram of the battery unit circuit 151, which is included with the battery unit 150 of FIGS. 7, 8 and 9, and FIG. 11 is a block diagram of a second portion of the battery unit circuit 151 of FIG. 10. It should be noted that the battery unit circuit 151 allows energy to be distributed, in a controlled manner, to other electrical devices through the electrical distribution system.

In this embodiment, the battery unit circuit 151 includes the power outlet assembly 160, which is described above. The power outlet assembly 160 is carried by the battery unit housing 151, as shown in FIGS. 7, 8, and 9. The power outlet assembly 160 receives the power signal $S_{Power}$. The power signal $S_{Power}$ can be provided to the power outlet assembly 160 in many different ways, such as from the service panel (not shown). The service panel is connected to the power outlet assembly 160 through an electrical distribution system. An example electrical distribution system is a power grid, a micro-grid, and the like.

In this embodiment, the battery unit circuit 151 includes the inverter 107, which is coupled to the power outlet assembly 160. As mentioned above, the inverter 107 can be of many different types. In this embodiment, the inverter 107 converts power signals between alternating current and direct current power signals. In this embodiment, the inverter 107 receives the power in signal $S_{PowerIn}$ from the power outlet assembly 160, and provides the battery in signal $S_{BatteryIn}$ in response. The battery in signal $S_{BatteryIn}$ is a direct current power signal that corresponds to the alternating current power in signal $S_{PowerIn}$. Further, the inverter 107 receives the battery out signal $S_{BatteryOut}$, and provides the power out signal $S_{PowerOut}$ in response. The power out signal $S_{PowerOut}$ is an alternating current power signal that corresponds to the direct current battery out signal $S_{BatteryOut}$.

In this embodiment, the battery unit circuit 151 includes the battery cell 108 coupled to the inverter 107. As mentioned above, the battery cell 108 can be of many different types. In this embodiment, the battery cell 108 is a lithium-ion battery cell. The battery cell 108 provides the battery out signal $S_{BatteryOut}$ to the inverter 107. Further, the battery cell 108 receives the battery in signal $S_{BatteryIn}$ from the inverter 107. It should be noted that the power in signal $S_{PowerIn}$ is a portion of the power signal $S_{Power}$ that is provided to the power outlet assembly 160 and that the power out signal $S_{PowerOut}$ is another portion of the power signal $S_{Power}$ that is sent from the power outlet assembly 160 to the electrical system. It also should be noted that, in this embodiment, the power in $S_{PowerIn}$, power out $S_{PowerOut}$, and power $S_{Power}$ signals are alternating current power signals.

In this embodiment, the power outlet assembly 160 includes the battery unit power indicator 104, which is operatively coupled to the battery cell 108. The battery unit power indicator 104 is shown in FIG. 9. In operation, the battery unit power indicator 104 moves light in the first direction in response to receiving the battery in signal $S_{BatteryIn}$. Further, in operation, the battery unit power indicator 104 moves light in the second direction in response to providing the battery out signal $S_{BatteryOut}$.

The battery unit circuit 101 includes a transceiver 109 coupled to the battery cell 108. The transceiver 109 can be of many different types, such as a Wi-Fi radio or other mesh network transceiver that allows communication and control wirelessly. The transceiver 109 is powered in response to receiving the battery signal $S_{Battery}$ from the battery cell 108, wherein the battery signal $S_{Battery}$ is a direct current power signal. As mentioned above, the battery signal $S_{Battery}$ can be used to power other components of the battery unit circuit 101, if desired.

In this embodiment, the power outlet assembly 160 includes the wireless connection indicator 105, which is operatively coupled to the transceiver 109. The wireless connection indicator 105 is shown in FIG. 9. As mentioned above, the wireless connection indicator 105 provides an indication of the amount of wireless connection power received by the battery unit 100. In particular, the wireless connection indicator 105 provides an indication of the amount of wireless connection power received by the transceiver 109. The wireless connection power corresponds to the strength of a wireless signal that flows between the battery unit 100 and another device. In particular, the wireless connection power corresponds to the strength of a wireless signal that flows between the transceiver 109 and another device. The other device can be of many different types, as will be discussed in more detail below with FIGS. 12, 13, 14, and 15.

In operation, the wireless connection indicator 105 moves light in the third direction in response to the wireless connection power received by the transceiver 109 increasing. Further, in operation, the wireless connection indicator 105 moves light in the fourth direction in response to the wireless connection power received by the transceiver 109 decreasing. The wireless connection power can correspond to the power of many different types of wireless signals. In this embodiment, the wireless connection power corresponds to the power of the control signal $S_{Control}$ and/or data signal $S_{Data}$. In other embodiments, such as those discussed with FIGS. 12, 13, 14, and 15 below, the wireless connection power corresponds to one or more wireless signals $S_1$, $S_2$, and $S_3$.

Figure 11:
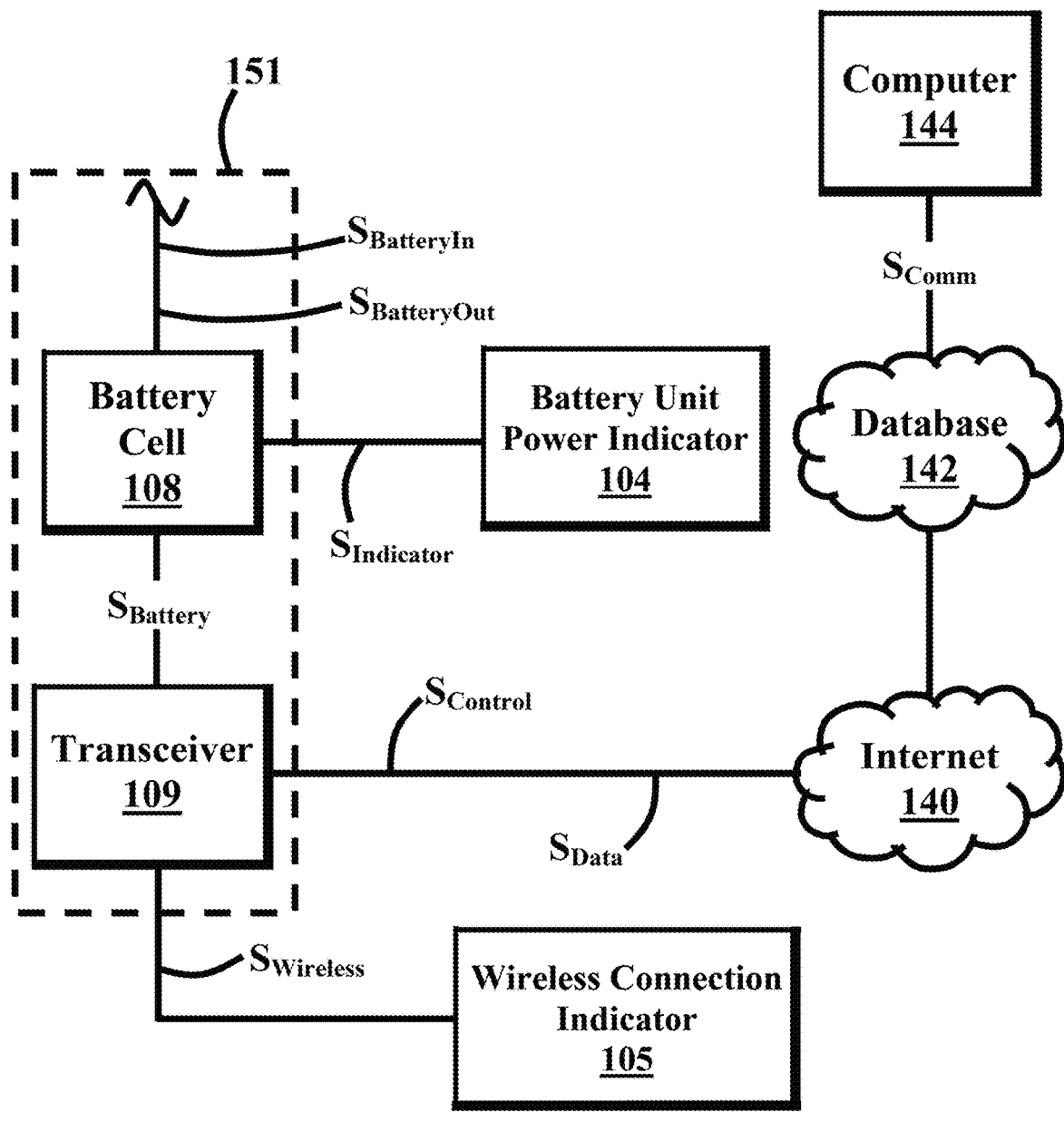
FIG. 11 is a block diagram of a second portion of the battery unit circuit of FIG. 10.

As shown in FIG. 11, the control signal $S_{Control}$ and data signal $S_{Data}$ flow between the transceiver 109 and internet 140. It should be noted that the internet 140 typically includes one or more computer networks. The computer network can be of many different types, such as a wide area network (WAN) and local area network (LAN).

In this embodiment, the internet 140 is in communication with a database 142, which is used for data logging, billing, and prediction of future charge and discharge patterns of the user based on past consumption locally or remotely. The database 142 can be accessed remotely via a web portal via computer 144. In an example embodiment, the communication with the database 142 and communication via the internet 140 will be intermittent and on demand.

In this embodiment, the database 142 is in communication with a computer 144. The computer 144 can be of many different types, such as a server, which operates a web-based portal or web-based interface. The computer 144 can also be a mobile device, such as a smart phone and tablet. Examples of smart phones include the IPHONE and ANDROID devices, and an example of a tablet is an IPAD. In an example embodiment, not shown, the computer 144 is in direct communication with the internet 140.

Figure 12:
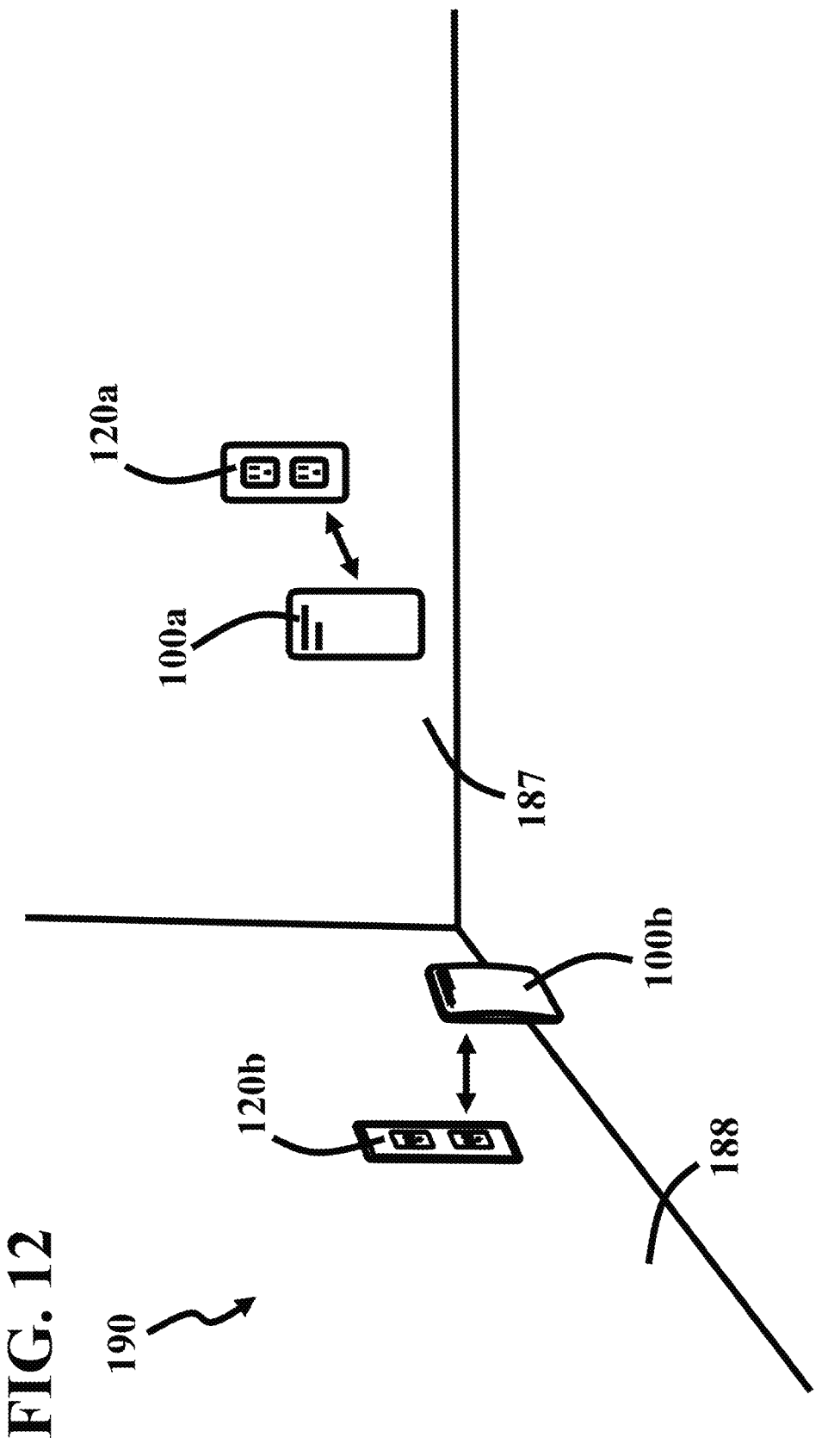
FIGS. 12 and 13 are perspective views of a first embodiment of a battery unit network.
Figure 13:
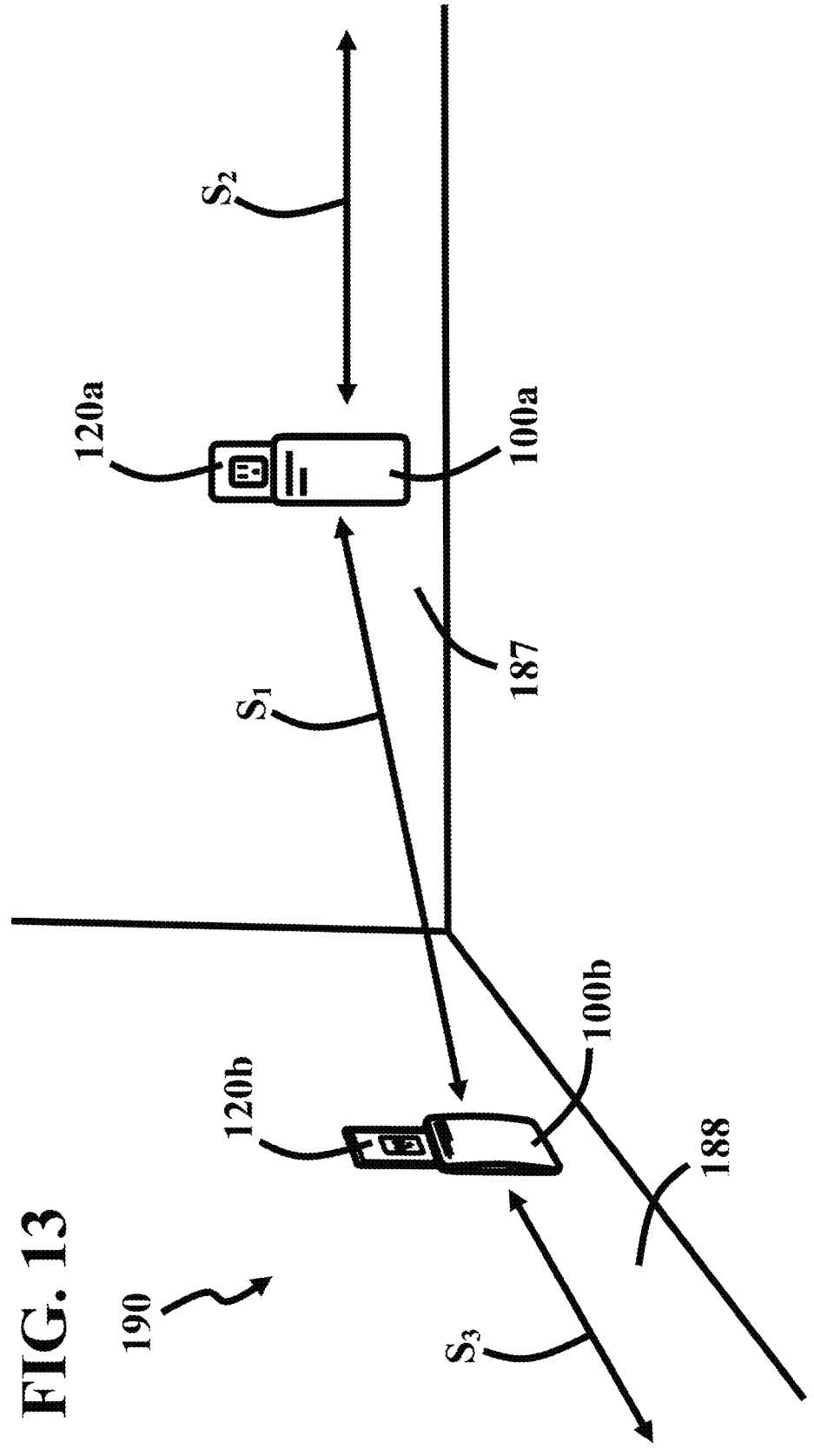

FIGS. 12 and 13 are perspective views of a first embodiment of a battery unit network, denoted as battery unit network 190. In this embodiment, a power outlet assembly 120a extends through the wall member 187, wherein the power outlet assembly 120a is the same as the power outlet assembly 120. The battery unit network 190 includes a battery unit 100a, which is repeatably moveable between uncoupled (FIG. 12) and coupled (FIG. 13) positions with the power outlet assembly 120a. It should be noted that the battery unit 100a is the same as the battery unit 100, and includes the battery unit circuit 101 (FIGS. 5 and 6). More information regarding moving the battery unit 100a between coupled and uncoupled conditions with the power outlet assembly 120a is provided in more detail above with FIGS. 3 and 4.

In this embodiment, a power outlet assembly 120b extends through the wall member 188, wherein the power outlet assembly 120b is the same as the power outlet assembly 120. The battery unit network 190 includes a battery unit 100b, which is repeatably moveable between uncoupled (FIG. 12) and coupled (FIG. 13) positions with the power outlet assembly 120b. It should be noted that the battery unit 100b is the same as the battery unit 100. More information regarding moving the battery unit 100b between coupled and uncoupled conditions with the power outlet assembly 120b is provided in more detail above with FIGS. 3 and 4. It should be noted that wall members 187 and 188 are typically carried by a frame, such as the frame 180 of FIG. 8.

In this embodiment, the battery units 100a and 100b establish communication with each other so that a wireless signal $S_1$ can flow therebetween. The wireless signal $S_1$ is used to coordinate a discharge on the electrical distribution system to aggregate the available capacity of the distributed energy storage system. For example, the wireless signal $S_1$ can coordinate the discharge on the electrical distribution system between the battery units 100a and 100b to aggregate the available capacity between them.

The battery unit 100a can establish communication with a first remote device so that a wireless signal $S_2$ can flow therebetween. The wireless signal $S_2$ is used to coordinate charge and discharge sequences on the electrical distribution system to aggregate the available capacity of the distributed energy storage system. For example, the wireless signal $S_2$ can coordinate the discharge on the electrical distribution system between the battery unit 100a and the first remote device to aggregate the available capacity between them.

The battery unit 100b can establish communication with a second remote device so that a wireless signal $S_3$ can flow therebetween. The wireless signal $S_3$ is used to coordinate charge and discharge sequences on the electrical distribution system to aggregate the available capacity of the distributed energy storage system. For example, the wireless signal $S_3$ can coordinate the discharge on the electrical distribution system between the battery unit 100b and the third remote device to aggregate the available capacity between them.

It should be noted that the first and second remote devices can be of many different types, such as a computer, smart phone, and/or tablet. The first and second remote devices can also be a server, which operates a web-based portal or web-based interface.

Figure 14:
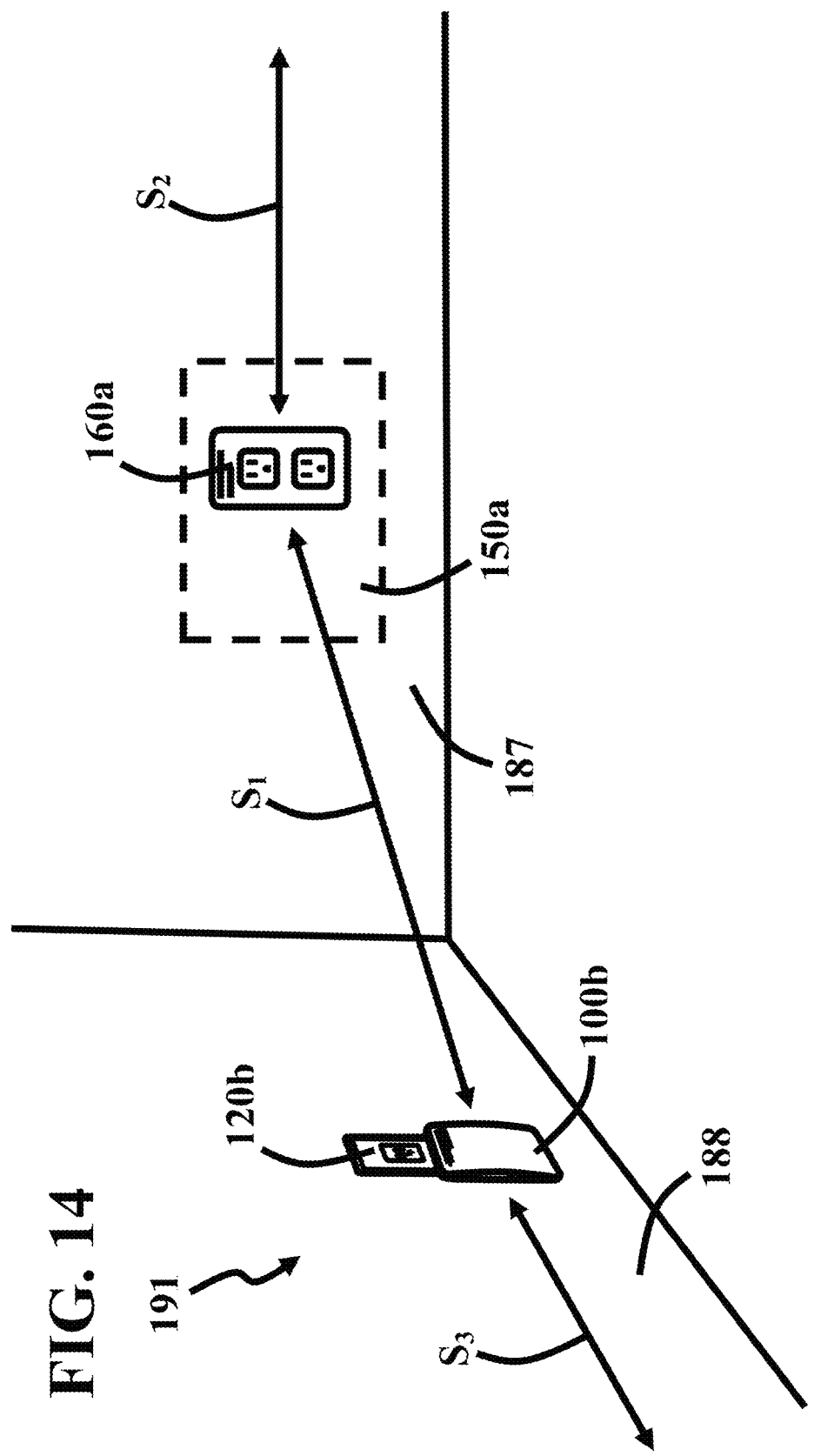
FIG. 14 is a perspective view of a second embodiment of a battery unit network.

FIG. 14 is a perspective view of a second embodiment of a battery unit network, denoted as battery unit network 191. In this embodiment, the battery unit network 191 includes a battery unit 150a, wherein the battery unit 150a includes a power outlet assembly 160a. It should be noted that the battery unit 150a is the same as the battery unit 150 (FIGS. 7, 8, and 9), and includes the battery unit circuit 151 (FIGS. 10 and 11). Further, the power outlet assembly 160a corresponds to the power outlet assembly 160 (FIG. 9).

In this embodiment, the battery unit 150a extends through the wall member 187, wherein the wall member 187 is carried by the frame 180 (FIG. 8). Further, the power outlet assembly 160a extends through the wall member 187 (FIG. 9).

The battery unit network 191 includes the battery unit 100b, which is repeatably moveable between uncoupled (FIG. 12) and coupled (FIG. 13) positions with the power outlet assembly 120b. As mentioned above, the battery unit 100b is the same as the battery unit 100.

In this embodiment, the battery units 150a and 100b establish communication with each other so that the wireless signal $S_1$ can flow therebetween. As mentioned above, the wireless signal $S_1$ is used to coordinate a discharge on the electrical distribution system to aggregate the available capacity of the distributed energy storage system. For example, the wireless signal $S_1$ can coordinate the discharge on the electrical distribution system between the battery units 150a and 100b to aggregate the available capacity between them. Although discussed herein in various examples as 'coordinating the discharge', it should be understood that the wireless signals may also be used to coordinate the charging of multiple devices connected to the electrical distribution system.

The battery unit 150a can establish communication with the first remote device so that the wireless signal $S_2$ can flow therebetween. As mentioned above, the wireless signal $S_2$ is used to coordinate charge and discharge sequences on the electrical distribution system to aggregate the available capacity of the distributed energy storage system. For example, the wireless signal $S_2$ can coordinate the discharge on the electrical distribution system between the battery unit 150a and the first remote device to aggregate the available capacity between them.

The battery unit 100b can establish communication with the second remote device so that a wireless signal $S_3$ can flow therebetween. As mentioned above, the wireless signal $S_3$ is used to coordinate charge and discharge sequences on the electrical distribution system to aggregate the available capacity of the distributed energy storage system. For example, the wireless signal $S_3$ can coordinate the discharge on the electrical distribution system between the battery unit 100b and the third remote device to aggregate the available capacity between them.

Figure 15:
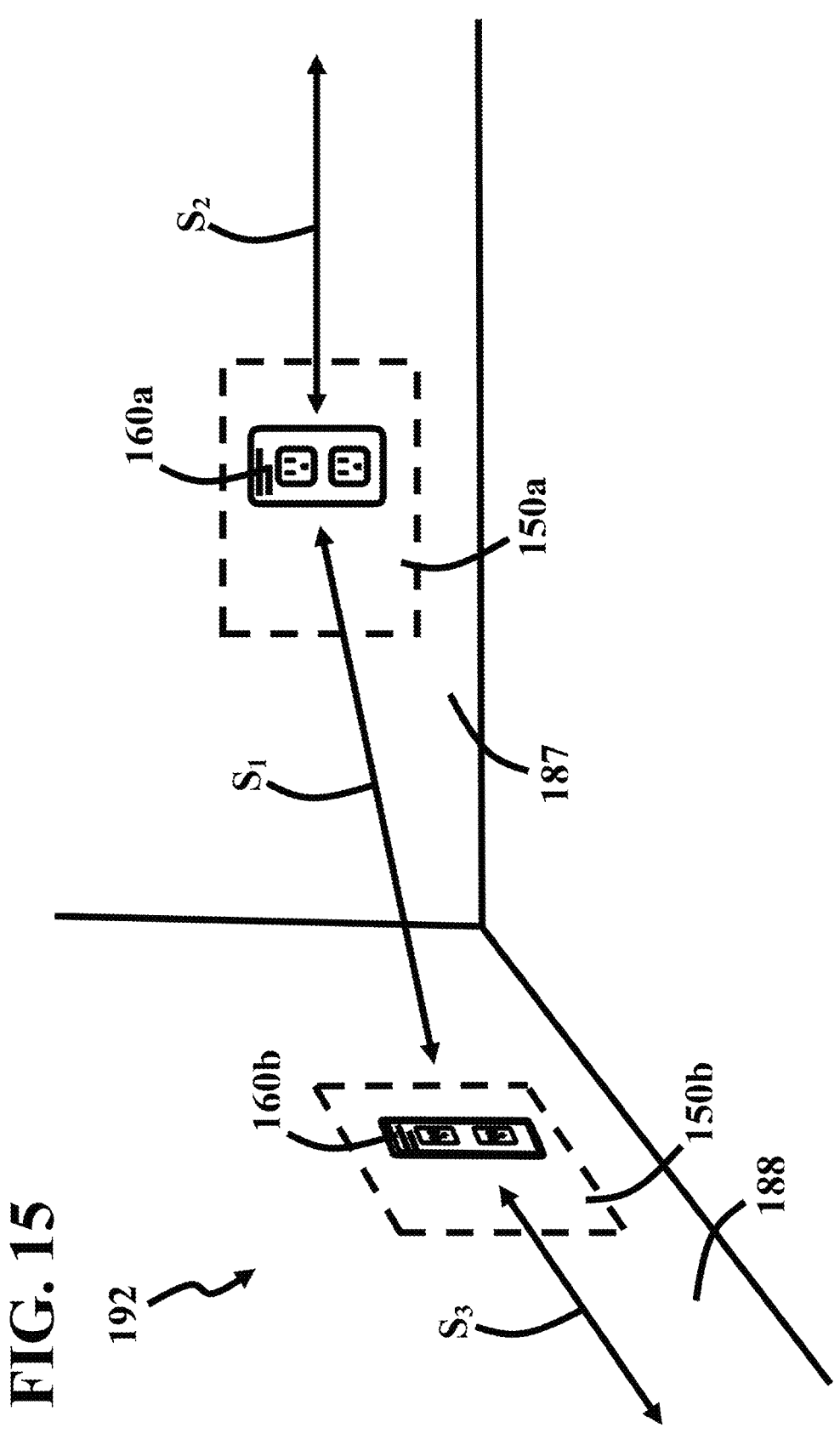
FIG. 15 is a perspective view of a third embodiment of a battery unit network.

FIG. 15 is a perspective view of a third embodiment of a battery unit network, denoted as battery unit network 192. In this embodiment, the battery unit network 192 includes the battery unit 150a, wherein the battery unit 150a includes a power outlet assembly 160a. As mentioned above, the battery unit 150a is the same as the battery unit 150 (FIGS. 7, 8, and 9), and includes the battery unit circuit 151 (FIGS. 10 and 11). Further, the power outlet assembly 160a corresponds to the power outlet assembly 160 (FIG. 9).

As mentioned above, the battery unit 150a extends through the wall member 187, wherein the wall member 187 is carried by the frame 180 (FIG. 8). Further, the power outlet assembly 160a extends through the wall member 187 (FIG. 9).

The battery unit network 192 includes a battery unit 150b, wherein the battery unit 150b includes a power outlet assembly 160b. In this embodiment, the battery unit 150b is the same as the battery unit 150 (FIGS. 7, 8, and 9), and includes the battery unit circuit 151 (FIGS. 10 and 11). Further, the power outlet assembly 160b corresponds to the power outlet assembly 160 (FIG. 9).

As mentioned above, the battery unit 150b extends through the wall member 188, wherein the wall member 188 is carried by the frame 180 (FIG. 8). Further, the power outlet assembly 160b extends through the wall member 188 (FIG. 9).

In this embodiment, the battery units 150a and 150b establish communication with each other so that the wireless signal $S_1$ can flow therebetween. As mentioned above, the wireless signal $S_1$ is used to coordinate charge and discharge sequences on the electrical distribution system to aggregate the available capacity of the distributed energy storage system. For example, the wireless signal $S_1$ can coordinate the discharge on the electrical distribution system between the battery units 150a and 150b to aggregate the available capacity between them.

The battery unit 150a can establish communication with the first remote device so that the wireless signal $S_2$ can flow therebetween. As mentioned above, the wireless signal $S_2$ is used to coordinate charge and discharge sequences on the electrical distribution system to aggregate the available capacity of the distributed energy storage system. For example, the wireless signal $S_2$ can coordinate the discharge on the electrical distribution system between the battery unit 150a and the first remote device to aggregate the available capacity between them.

The battery unit 150b can establish communication with a remote device so that the wireless signal $S_3$ can flow therebetween. As mentioned above, the wireless signal $S_3$ is used to coordinate charge and discharge sequences on the electrical distribution system to aggregate the available capacity of the distributed energy storage system. For example, the wireless signal $S_3$ can coordinate the discharge on the electrical distribution system between the battery unit 150b and the third remote device to aggregate the available capacity between them.

Figure 16:
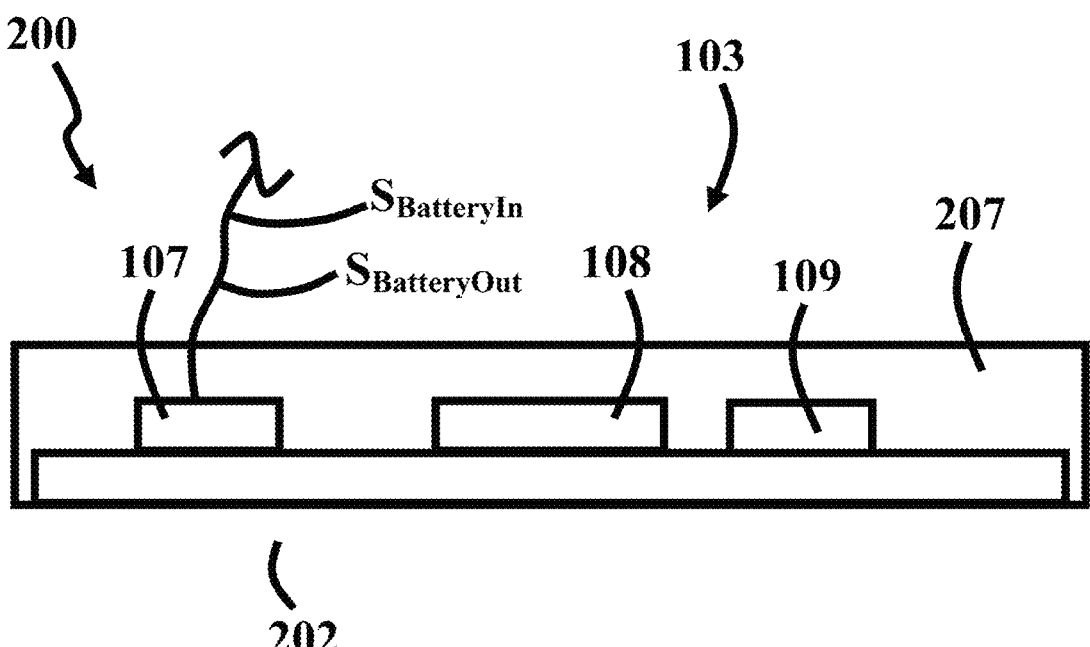
FIG. 16 is a side view of a light fixture, which includes a battery unit circuit.

FIG. 16 is a side view of a light fixture 200, which includes a battery unit circuit 103. In one example embodiment, the battery unit housing is a luminaire 202 comprising the battery unit circuit 103, including the inverter 107, battery cell 108, and transceiver 109. See also FIGS. 17 and 18. In another embodiment, similar to FIGS. 7-9, the battery unit housing is part of the fixture. See FIG. 19.

Thus, in one example embodiment, the light fixture 200 includes a light housing 207, which carries a luminaire 202. The luminaire 202 can be of many different light emitting diodes (LED). In some embodiments, the luminaire 202 includes an array of LEDs. Examples of luminaires 202 are sometimes referred to as Troffer lights. Troffer lights are manufactured by many different companies, such as CREE and PHILIPS. In this embodiment, the light fixture 200 includes the inverter 107, battery cell 108, and transceiver 109, which are discussed in more detail above. The signals $S_{BatteryIn}$ and $S_{BatteryOut}$ flow to and from, respectively, the inverter 107, as described in more detail above. It should be noted that the light fixture discussed herein can be embodied as other types of light fixtures, one of which will be discussed in more detail presently.

Figure 17:
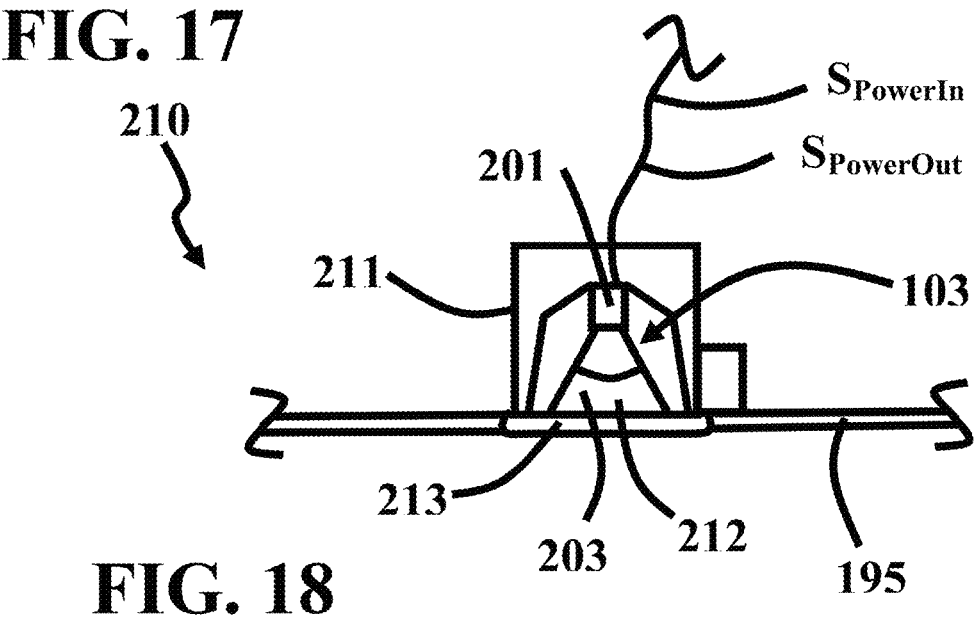
FIG. 17 is a side view of a can light fixture, which includes a battery unit circuit.

FIG. 17 is a side view of a can light fixture 210, which includes the battery unit circuit 103 in the luminaire 212. In this embodiment, the can light fixture includes a light housing 211, which is carried by a ceiling 195. A faceplate 213 can optionally be coupled to the light housing 211. The can light fixture 210 further comprises a luminaire holder 201 such as a luminaire socket. The luminaire socket can be configured to receive a luminaire base 205. For example, the luminaire base 205 may be configured with screws to be coupled to the luminaire socket by being screwed in. Power, e.g., $S_{PowerIn}$ or $S_{PowerOut}$ may be communicated from the building electric system directly to the luminaire holder 201.

In this embodiment, the can light fixture 210 includes a luminaire holder 201, which is carried by the light housing 211. A luminaire 203 is coupled to the luminaire holder 201. The luminaire 203 can be of many different types. In this embodiment, the luminaire 203 includes an LED. In some embodiments, the luminaire 203 includes an array of LEDs.

Figure 18:
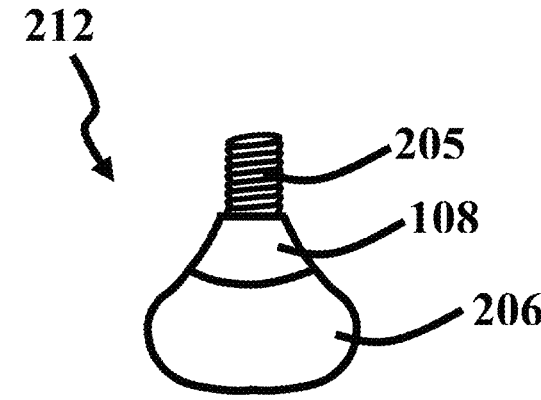
FIG. 18 is a side view of a luminaire, which is included with the can light fixture of FIG. 17.

FIG. 18 is a side view of the luminaire 212. In this embodiment, the luminaire 212 includes a luminaire base 205, which is repeatably moveable between coupled and uncoupled positions with the luminaire holder 201. The luminaire 212 includes a luminaire enclosure 206, which encloses the LEDs included therewith. In this embodiment, the luminaire 212 includes the battery cell 108 and the inverter 107. In a further embodiment, the luminaire 212 also includes the transceiver 109. Hence, in FIGS. 17 and 18, a portion of the battery unit circuit 103 is housed by the luminaire 212.

Figure 19:
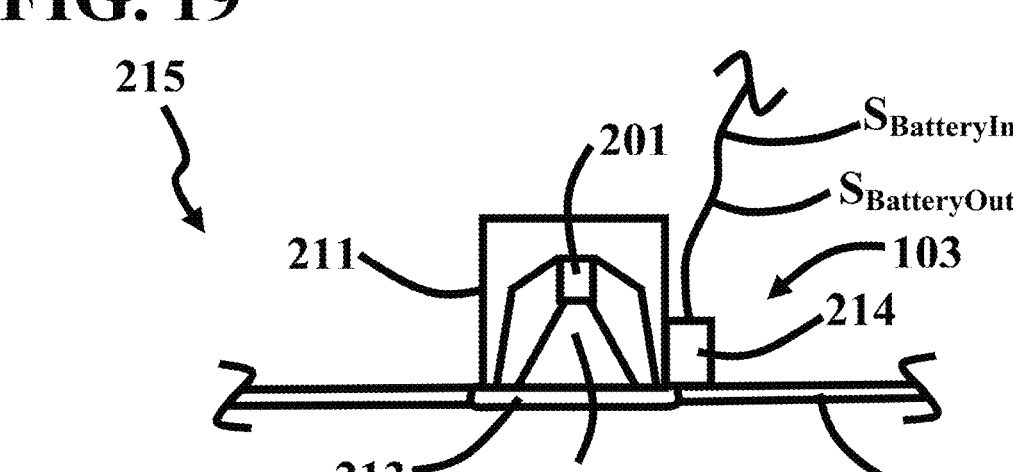
FIG. 19 is a side view of another embodiment of a can light fixture, which includes a battery unit circuit.

FIG. 19 is a side view of a can light fixture 215, which includes the battery unit circuit 103. In this embodiment, the can light fixture includes the light housing 211, which is carried by the ceiling 195. The faceplate 213 can optionally be coupled to the light housing 211. The can light fixture 215, in this example embodiment, includes the enclosure 214 positioned proximate to the light housing 211. In this embodiment, the enclosure 214 houses the battery unit circuit 103.

In this embodiment, the can light fixture 215 includes the luminaire holder 201, which is carried by the light housing 211. A luminaire 204 is coupled to the luminaire holder 201, such as by screwing the base of the luminaire into a luminaire socket. The luminaire 204 can be of many different types. In this embodiment, the luminaire 204 includes an LED. In some embodiments, the luminaire 204 includes an array of LEDs. In this embodiment, the battery unit circuit is not included with the luminaire 204. The battery unit circuit 103 is housed by the enclosure 214.

Figure 20:
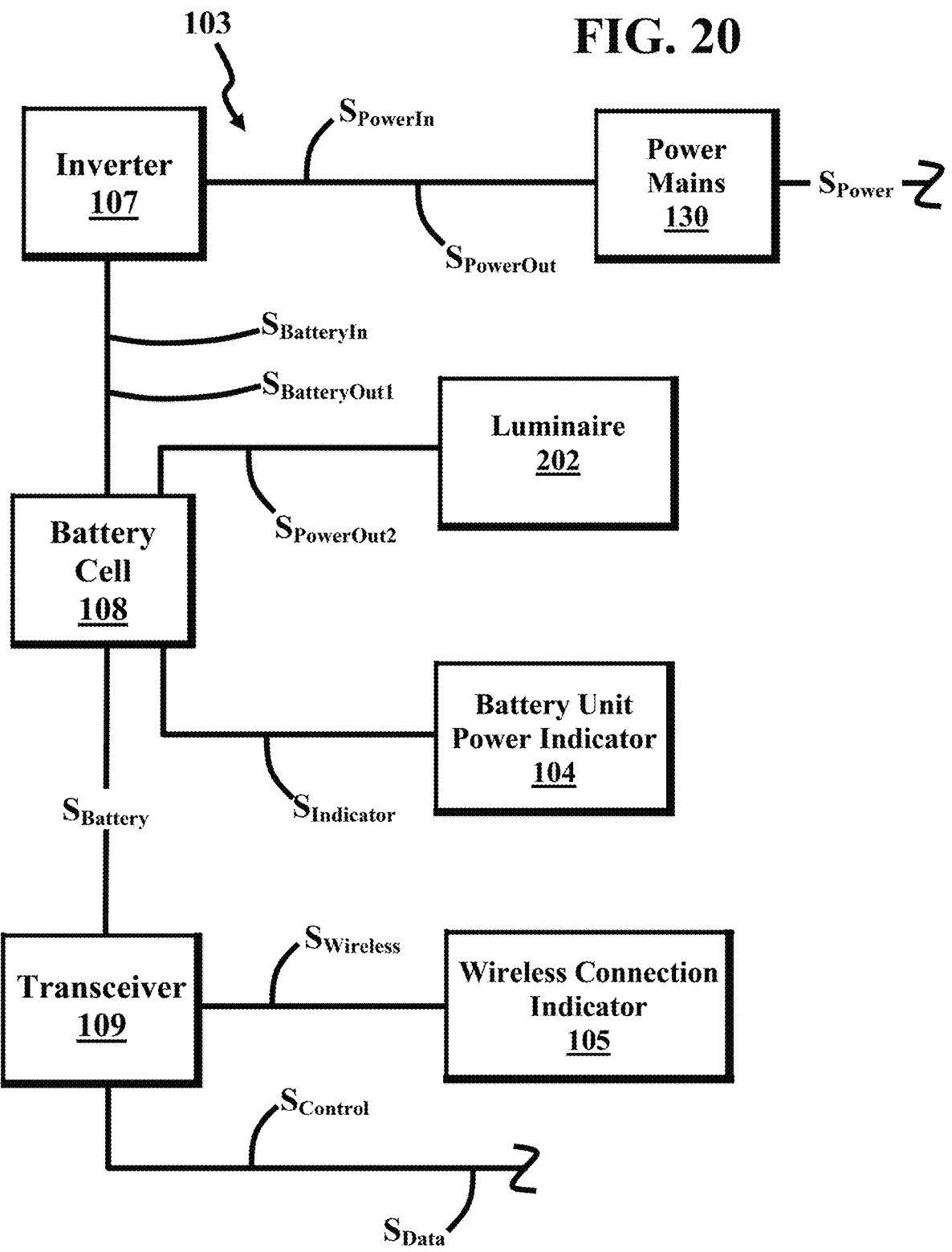
FIG. 20 is a block diagram of a first portion of the battery unit circuit, which can be included with the light fixtures of FIGS. 16, 17, 18, and 19.
Figure 21:
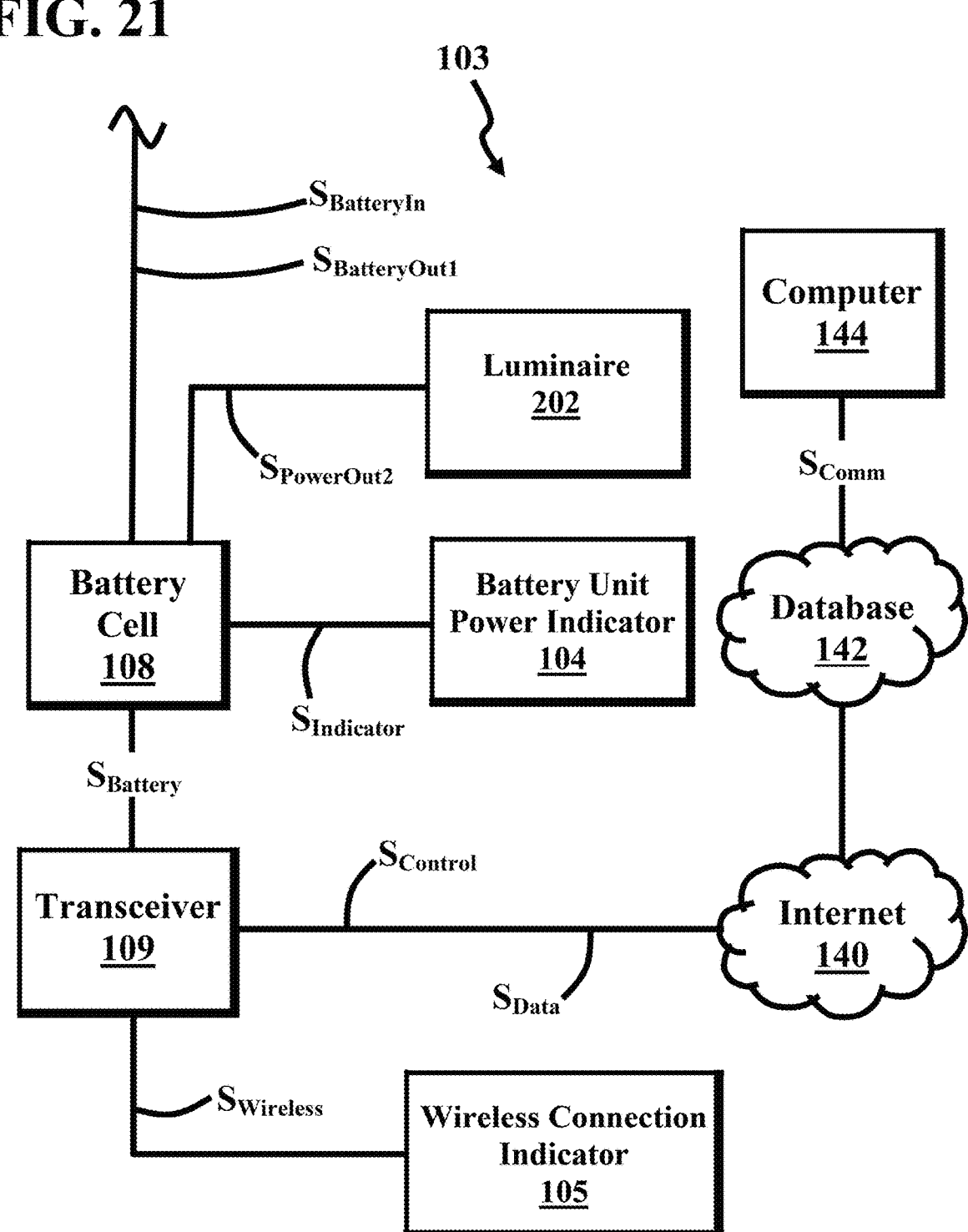
FIG. 21 is a block diagram of a second portion of the battery unit circuit of FIG. 20.

FIG. 20 is a block diagram of a first portion of the battery unit circuit 103, which can be included with the light fixtures 200, 210, and 215 of corresponding FIGS. 16, 17, 18, and 19. FIG. 21 is a block diagram of a second portion of the battery unit circuit 103 of FIG. 20. It should be noted that the battery unit circuit 103 allows energy to be distributed, in a controlled manner, to other electrical devices through the electrical distribution system. In this embodiment, the battery unit circuit 103 includes the power mains 130, which is described herein. The power in the signal $S_{PowerIn}$ is provided by the power mains 130.

In this embodiment, the battery unit circuit 103 includes the inverter 107, which is coupled to the power mains 130. The inverter 107 can be of many different types. In this embodiment, the inverter 107 converts power signals between alternating current and direct current power signals. In this embodiment, the inverter 107 receives the power in signal $S_{PowerIn}$ from the power mains 130, and provides the battery in signal $S_{BatteryIn}$ in response. The battery in signal $S_{BatteryIn}$ is a direct current power signal that corresponds to the alternating current power in signal $S_{PowerIn}$. Further, the inverter 107 receives a battery out signal $S_{BatteryOut}$, and provides the power out signal $S_{PowerOut}$ in response. The power out signal $S_{PowerOut}$ is an alternating current power signal that corresponds to the direct current battery out signal $S_{BatteryOut}$.

The battery unit circuit 103 includes the battery cell 108 coupled to the inverter 107. The battery cell 108 can be of many different types. In this embodiment, the battery cell 108 is a lithium-ion battery cell. The battery cell 108 provides the battery out signal $S_{BatteryOut}$ to the inverter 107. Further, the battery cell 108 receives the battery in signal $S_{BatteryIn}$ from the inverter 107.

In this embodiment, the battery unit circuit 103 includes the battery unit power indicator 104, which is operatively coupled to the battery cell 108. The battery unit power indicator 104 is shown in FIGS. 1 and 4. In operation, the battery unit power indicator 104 moves light in the first direction in response to receiving the battery in signal $S_{BatteryIn}$. Further, in operation, the battery unit power indicator 104 moves light in the second direction in response to providing the battery out signal $S_{BatteryOut}$.

The battery unit circuit 103 includes the transceiver 109 coupled to the battery cell 108. The transceiver 109 can be of many different types, such as a Wi-Fi radio or other mesh network transceiver that allows communication and control wirelessly. The transceiver 109 is powered in response to receiving a battery signal $S_{Battery}$ from the battery cell 108, wherein the battery signal $S_{Battery}$ is a direct current power signal. It should be noted that the battery signal $S_{Battery}$ can be used to power other components of the battery unit circuit 103, if desired.

In this embodiment, the battery unit circuit 103 includes the wireless connection indicator 105, which is operatively coupled to the transceiver 109. The wireless connection indicator 105 is shown in FIGS. 1 and 4. As mentioned above, the wireless connection indicator 105 provides an indication of the amount of wireless connection power received by the battery unit 100. In particular, the wireless connection indicator 105 provides an indication of the amount of wireless connection power received by the transceiver 109. The wireless connection power corresponds to the strength of a wireless signal that flows between the battery unit 100 and another device. In particular, the wireless connection power corresponds to the strength of a wireless signal that flows between the transceiver 109 and another device. The other device can be of many different types, as will be discussed in more detail below with FIGS. 22, 23, 24, and 25. It should be noted that the battery unit circuit 103 can be housed by the light housing 207 of FIG. 16. Further, the battery unit circuit 103 can be housed by the enclosure 214 of FIGS. 17 and 19.

In operation, the wireless connection indicator 105 moves light in the third direction in response to the wireless connection power received by the transceiver 109 increasing. Further, in operation, the wireless connection indicator 105 moves light in the fourth direction in response to the wireless connection power received by the transceiver 109 decreasing. The wireless connection power can correspond to the power of many different types of wireless signals. In this embodiment, the wireless connection power corresponds to the power of a control signal $S_{Control}$ and/or data signal $S_{Data}$. In other embodiments, such as those discussed with FIGS. 22, 23, 24, and 25 below, the wireless connection power corresponds to one or more wireless signals $S_1$, $S_2$, and $S_3$.

As shown in FIG. 21, the control signal $S_{Control}$ and data signal $S_{Data}$ flow between the transceiver 109 and internet 140. It should be noted that the internet 140 typically includes one or more computer networks. The computer network can be of many different types, such as a wide area network (WAN) and local area network (LAN).

In this embodiment, the internet 140 is in communication with the database 142, which is used for data logging, billing, and prediction of future charge and discharge patterns of the user based on past consumption locally or remotely. The database 142 can be accessed remotely via a web portal via computer 144. In an example embodiment, communication with the database 142 and communication via the internet 140 will be intermittent and on demand.

In this embodiment, the database 142 is in communication with the computer 144. The computer 144 can be of many different types, such as a server, which operates a web-based portal or web-based interface. The computer 144 can also be a mobile device, such as a smart phone and tablet. Examples of smart phones include the IPHONE and ANDROID devices, and an example of a tablet is an IPAD. In an example embodiment, the computer 144 is in direct communication with the internet 140.

Figure 22:
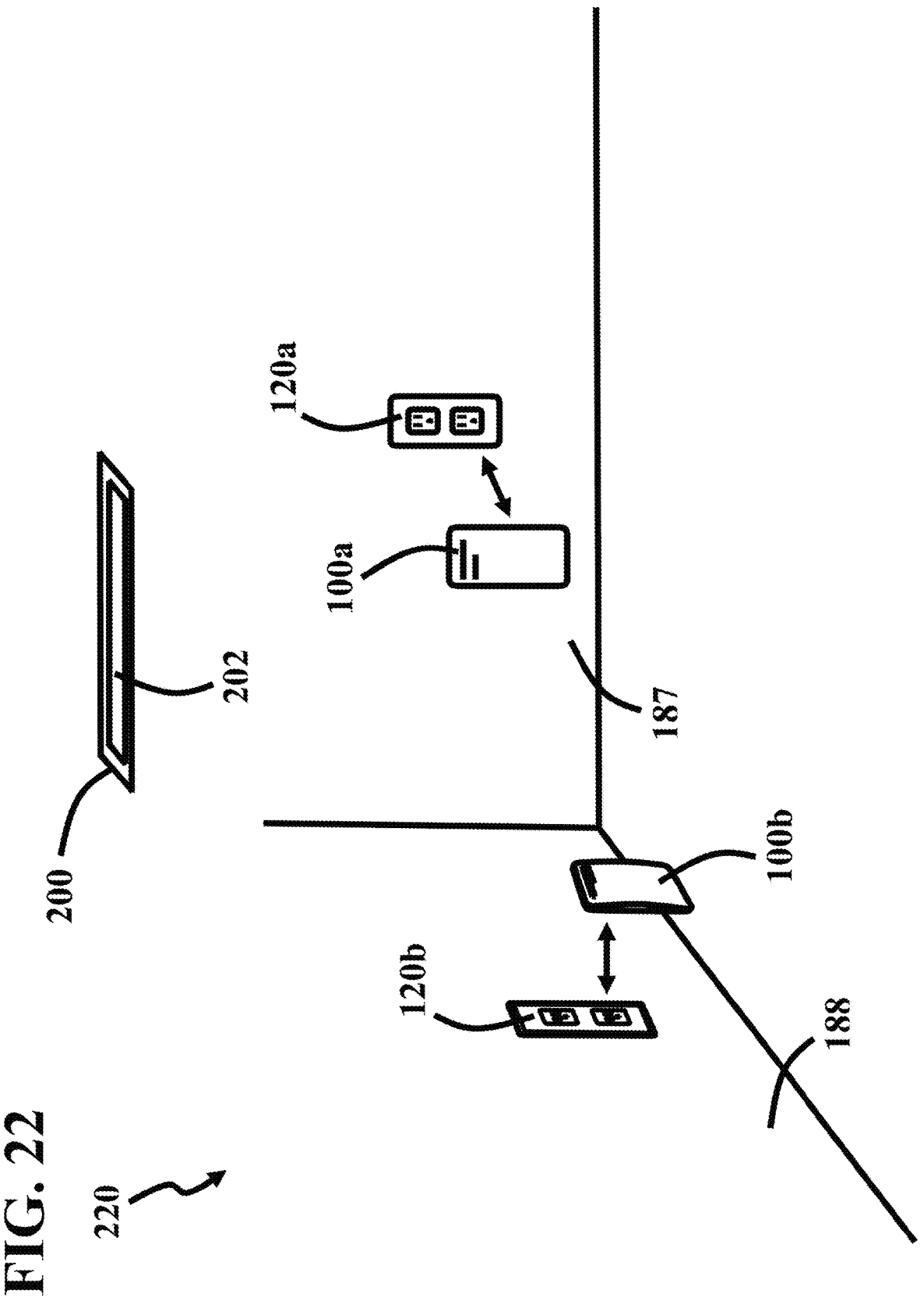
FIGS. 22 and 23 are perspective views of a fourth embodiment of a battery unit network.
Figure 23:
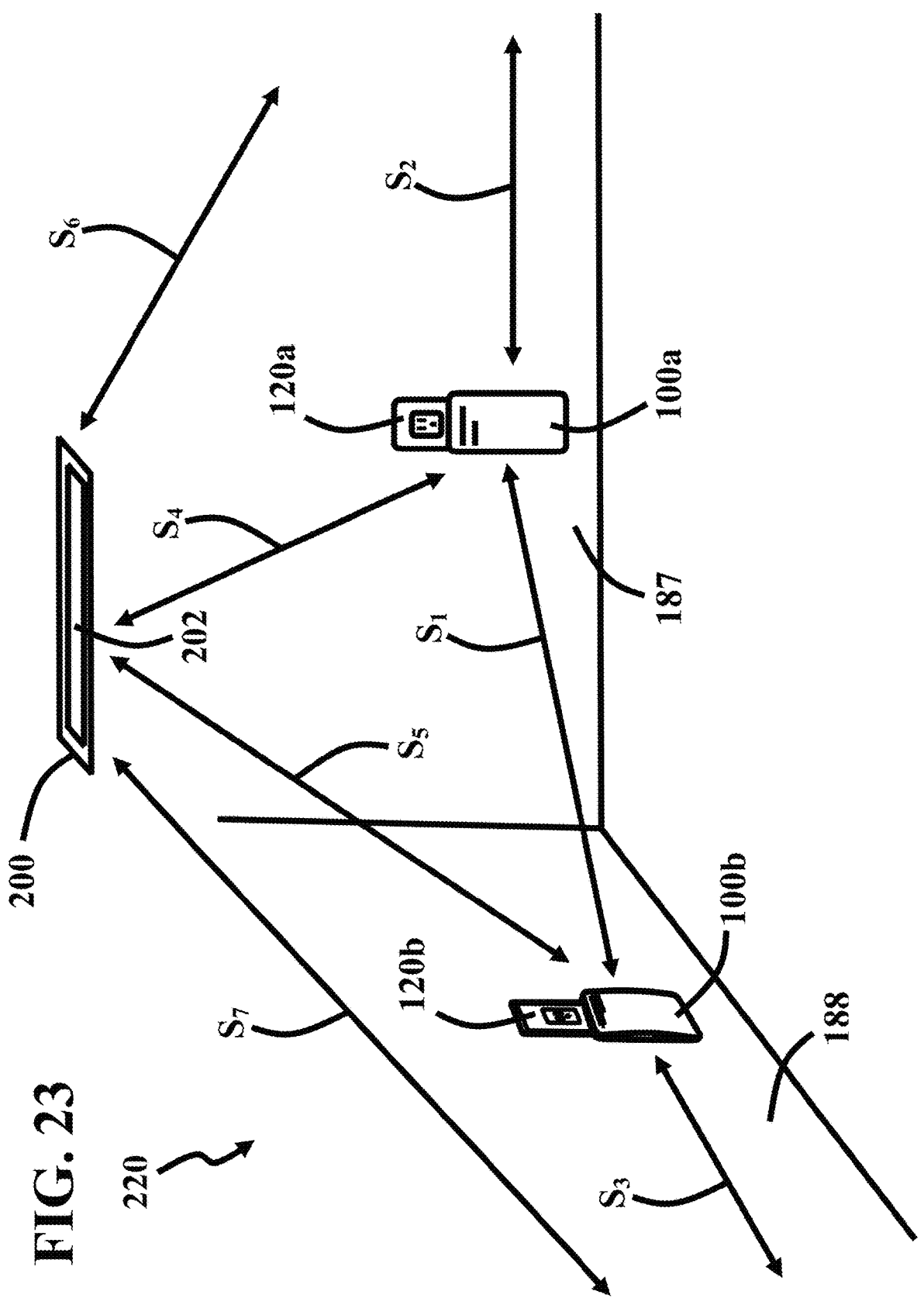

FIGS. 22 and 23 are perspective views of a fourth embodiment of a battery unit network, denoted as battery unit network 220. In this embodiment, the power outlet assembly 120a extends through the wall member 187, wherein the power outlet assembly 120a is the same as the power outlet assembly 120. The battery unit network 220 includes the battery unit 100a, which is repeatably moveable between uncoupled (FIG. 22) and coupled (FIG. 23) positions with the power outlet assembly 120a. It should be noted that the battery unit 100a is the same as the battery unit 100, and includes the battery unit circuit 101 (FIGS. 5 and 6). More information regarding moving the battery unit 100a between coupled and uncoupled conditions with the power outlet assembly 120a is provided in more detail above with FIGS. 3 and 4.

In this embodiment, the power outlet assembly 120b extends through the wall member 188, wherein the power outlet assembly 120b is the same as the power outlet assembly 120. The battery unit network 220 includes the battery unit 100b, which is repeatably moveable between uncoupled (FIG. 22) and coupled (FIG. 23) positions with the power outlet assembly 120b. It should be noted that the battery unit 100b is the same as the battery unit 100. More information regarding moving the battery unit 100b between coupled and uncoupled conditions with the power outlet assembly 120b is provided in more detail above with FIGS. 3 and 4. It should be noted that wall members 187 and 188 are typically carried by a frame, such as the frame 180 of FIG. 8.

In this embodiment, the battery units 100a and 100b establish communication with each other so that the wireless signal $S_1$ can flow therebetween. The wireless signal $S_1$ is used to coordinate a discharge on the electrical distribution system to aggregate the available capacity of the distributed energy storage system. For example, the wireless signal $S_1$ can coordinate the discharge on the electrical distribution system between the battery units 100a and 100b to aggregate the available capacity between them.

The battery unit 100a can establish communication with a first remote device so that the wireless signal $S_2$ can flow therebetween. The wireless signal $S_2$ is used to coordinate charge and discharge sequences on the electrical distribution system to aggregate the available capacity of the distributed energy storage system. For example, the wireless signal $S_2$ can coordinate the discharge on the electrical distribution system between the battery unit 100a and the first remote device to aggregate the available capacity between them.

The battery unit 100b can establish communication with a second remote device so that the wireless signal $S_3$ can flow therebetween. The wireless signal $S_3$ is used to coordinate charge and discharge sequences on the electrical distribution system to aggregate the available capacity of the distributed energy storage system. For example, the wireless signal $S_3$ can coordinate the discharge on the electrical distribution system between the battery unit 100b and the third remote device to aggregate the available capacity between them.

In this embodiment, the battery unit network 220 includes the light fixture 200 (FIG. 16), wherein the light fixture 200 includes the battery unit circuit 103 (FIGS. 20 and 21). In this embodiment, the battery unit 100a establishes communication with the light fixture 200 so that a wireless signal $S_4$ can flow therebetween. The wireless signal $S_4$ is used to coordinate a discharge on the electrical distribution system to aggregate the available capacity of the distributed energy storage system. For example, the wireless signal $S_4$ can coordinate the discharge on the electrical distribution system between the battery unit circuit 101 (FIGS. 5 and 6) of the battery unit 100*a* and the battery unit circuit 103 (FIGS. 20 and 21) of the light fixture 200 to aggregate the available capacity between them.

In this embodiment, the light fixture 200 can establish communication with a fourth remote device so that a wireless signal $S_6$ can flow therebetween. The wireless signal $S_6$ is used to coordinate charge and discharge sequences on the electrical distribution system to aggregate the available capacity of the distributed energy storage system. For example, the wireless signal $S_6$ can coordinate the discharge on the electrical distribution system between the battery unit circuit 103 and the fourth remote device to aggregate the available capacity between them.

In this embodiment, the battery unit 100*b* establishes communication with the light fixture 200 so that a wireless signal $S_5$ can flow therebetween. The wireless signal $S_5$ is used to coordinate a discharge on the electrical distribution system to aggregate the available capacity of the distributed energy storage system. For example, the wireless signal $S_5$ can coordinate the discharge on the electrical distribution system between the battery unit circuit 101 (FIGS. 5 and 6) of the battery unit 100*b* and the battery unit circuit 103 (FIGS. 20 and 21) of the light fixture 200 to aggregate the available capacity between them.

In this embodiment, the light fixture 200 can establish communication with a fifth remote device so that a wireless signal $S_7$ can flow therebetween. The wireless signal $S_7$ is used to coordinate charge and discharge sequences on the electrical distribution system to aggregate the available capacity of the distributed energy storage system. For example, the wireless signal $S_7$ can coordinate the discharge on the electrical distribution system between the battery unit circuit 103 and the fifth remote device to aggregate the available capacity between them.

It should be noted that the fourth and fifth remote devices can be of many different types, such as a computer, smart phone, and/or tablet. The fourth and fifth remote devices can also be a server, which operates a web-based portal or web-based interface. The fourth remote device can be a battery unit and a light fixture. For example, the fourth remote device can include the can light fixtures 210 (FIG. 17) and 215 (FIG. 19). Further, the fifth remote device can be a battery unit and a light fixture. For example, the fifth remote device can include the can light fixtures 210 (FIG. 17) and 215 (FIG. 19).

Figure 24:
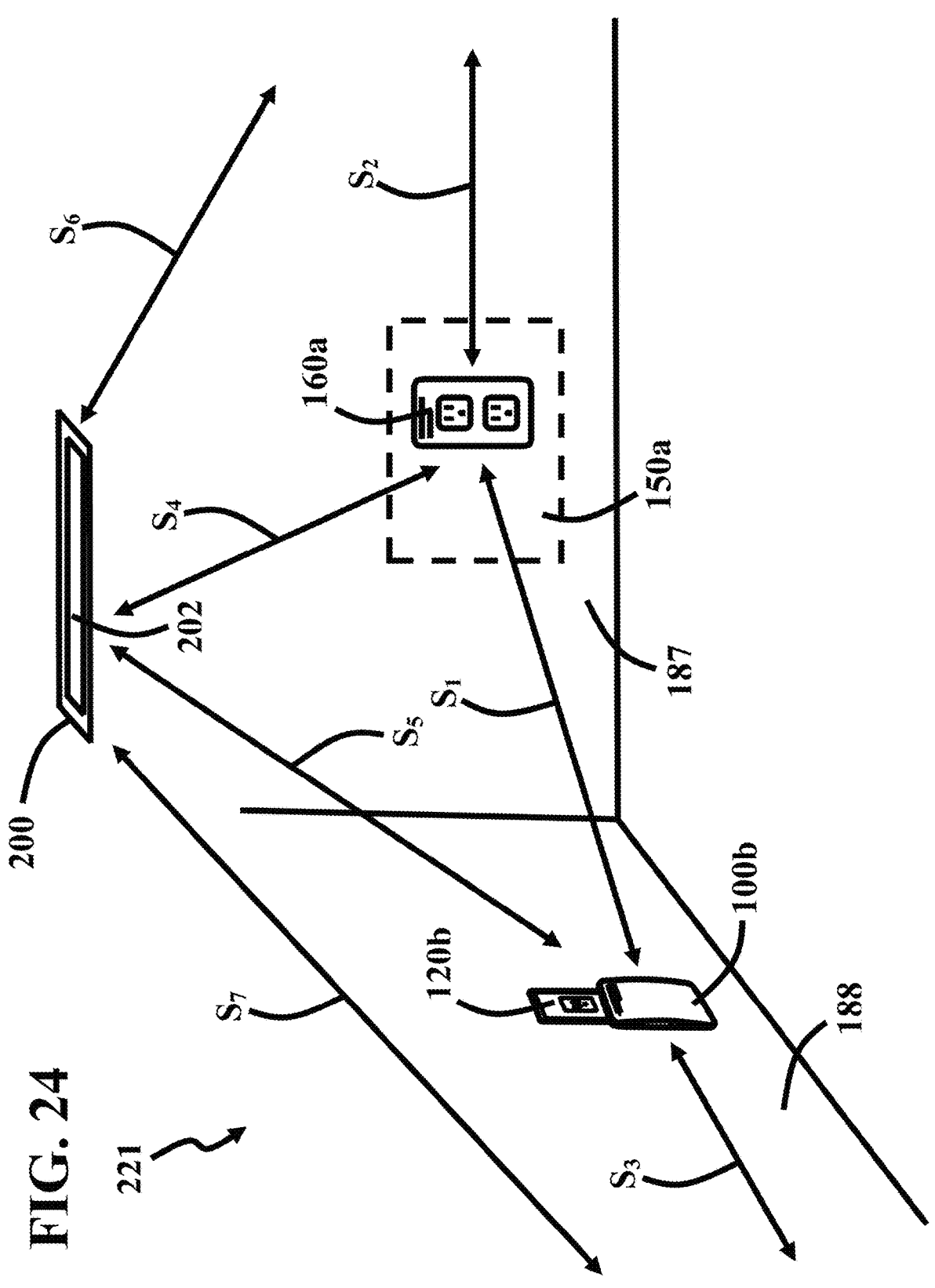
FIG. 24 is a perspective view of a fifth embodiment of a battery unit network.

FIG. 24 is a perspective view of a fifth embodiment of a battery unit network, denoted as battery unit network 221. In this embodiment, the battery unit network 221 includes the battery unit 150*a*, wherein the battery unit 150*a* includes the power outlet assembly 160*a*. It should be noted that the battery unit 150*a* is the same as the battery unit 150 (FIGS. 7, 8, and 9), and includes the battery unit circuit 151 (FIGS. 10 and 11). Further, the power outlet assembly 160*a* corresponds to the power outlet assembly 160 (FIG. 9).

In this embodiment, the battery unit 150*a* extends through the wall member 187, wherein the wall member 187 is carried by the frame 180 (FIG. 8). Further, the power outlet assembly 160*a* extends through the wall member 187 (FIG. 9).

The battery unit network 221 includes the battery unit 100*b*, which is repeatably moveable between uncoupled (FIG. 22) and coupled (FIG. 23) positions with the power outlet assembly 120*b*. As mentioned above, the battery unit 100*b* is the same as the battery unit 100.

In this embodiment, the battery units 150*a* and 100*b* establish communication with each other so that the wireless signal $S_1$ can flow therebetween. As mentioned above, the wireless signal $S_1$ is used to coordinate a discharge on the electrical distribution system to aggregate the available capacity of the distributed energy storage system. For example, the wireless signal $S_1$ can coordinate the discharge on the electrical distribution system between the battery units 150*a* and 100*b* to aggregate the available capacity between them.

The battery unit 150*a* can establish communication with the first remote device so that the wireless signal $S_2$ can flow therebetween. As mentioned above, the wireless signal $S_2$ is used to coordinate charge and discharge sequences on the electrical distribution system to aggregate the available capacity of the distributed energy storage system. For example, the wireless signal $S_2$ can coordinate the discharge on the electrical distribution system between the battery unit 150*a* and the first remote device to aggregate the available capacity between them.

The battery unit 100*b* can establish communication with the second remote device so that a wireless signal $S_3$ can flow therebetween. As mentioned above, the wireless signal $S_3$ is used to coordinate charge and discharge sequences on the electrical distribution system to aggregate the available capacity of the distributed energy storage system. For example, the wireless signal $S_3$ can coordinate the discharge on the electrical distribution system between the battery unit 100*b* and the third remote device to aggregate the available capacity between them.

In this embodiment, the battery unit network 221 includes the light fixture 200 (FIG. 16), wherein the light fixture 200 includes the battery unit circuit 103 (FIGS. 20 and 21). In this embodiment, the battery unit 160*a* establishes communication with the light fixture 200 so that the wireless signal $S_4$ can flow therebetween. The wireless signal $S_4$ is used to coordinate a discharge on the electrical distribution system to aggregate the available capacity of the distributed energy storage system. For example, the wireless signal $S_4$ can coordinate the discharge on the electrical distribution system between the battery unit circuit 151 (FIGS. 10 and 11) of the battery unit 160*a* and the battery unit circuit 103 (FIGS. 20 and 21) of the light fixture 200 to aggregate the available capacity between them.

In this embodiment, the light fixture 200 can establish communication with the fourth remote device so that the wireless signal $S_6$ can flow therebetween. The wireless signal $S_6$ is used to coordinate charge and discharge sequences on the electrical distribution system to aggregate the available capacity of the distributed energy storage system. For example, the wireless signal $S_6$ can coordinate the discharge on the electrical distribution system between the battery unit circuit 103 and the fourth remote device to aggregate the available capacity between them.

In this embodiment, the battery unit 100*b* establishes communication with the light fixture 200 so that a wireless signal $S_5$ can flow therebetween. The wireless signal $S_5$ is used to coordinate a discharge on the electrical distribution system to aggregate the available capacity of the distributed energy storage system. For example, the wireless signal $S_5$ can coordinate the discharge on the electrical distribution system between the battery unit circuit 101 (FIGS. 5 and 6) of the battery unit 100*b* and the battery unit circuit 103 (FIGS. 20 and 21) of the light fixture 200 to aggregate the available capacity between them.

In this embodiment, the light fixture 200 can establish communication with the fifth remote device so that a wireless signal $S_7$ can flow therebetween. The wireless signal $S_7$ is used to coordinate charge and discharge sequences on the electrical distribution system to aggregate the available capacity of the distributed energy storage system. For example, the wireless signal $S_7$ can coordinate the discharge on the electrical distribution system between the battery unit circuit 103 and the fifth remote device to aggregate the available capacity between them.

It should be noted that the fourth and fifth remote devices can be of many different types, such as a computer, smart phone, and/or tablet. The fourth and fifth remote devices can also be a server, which operates a web-based portal or web-based interface. The fourth remote device can be a battery unit and a light fixture. For example, the fourth remote device can include the can light fixtures 210 (FIG. 17) and 215 (FIG. 19). Further, the fifth remote device can be a battery unit and a light fixture. For example, the fifth remote device can include the can light fixtures 210 (FIG. 17) and 215 (FIG. 19).

Figure 25:
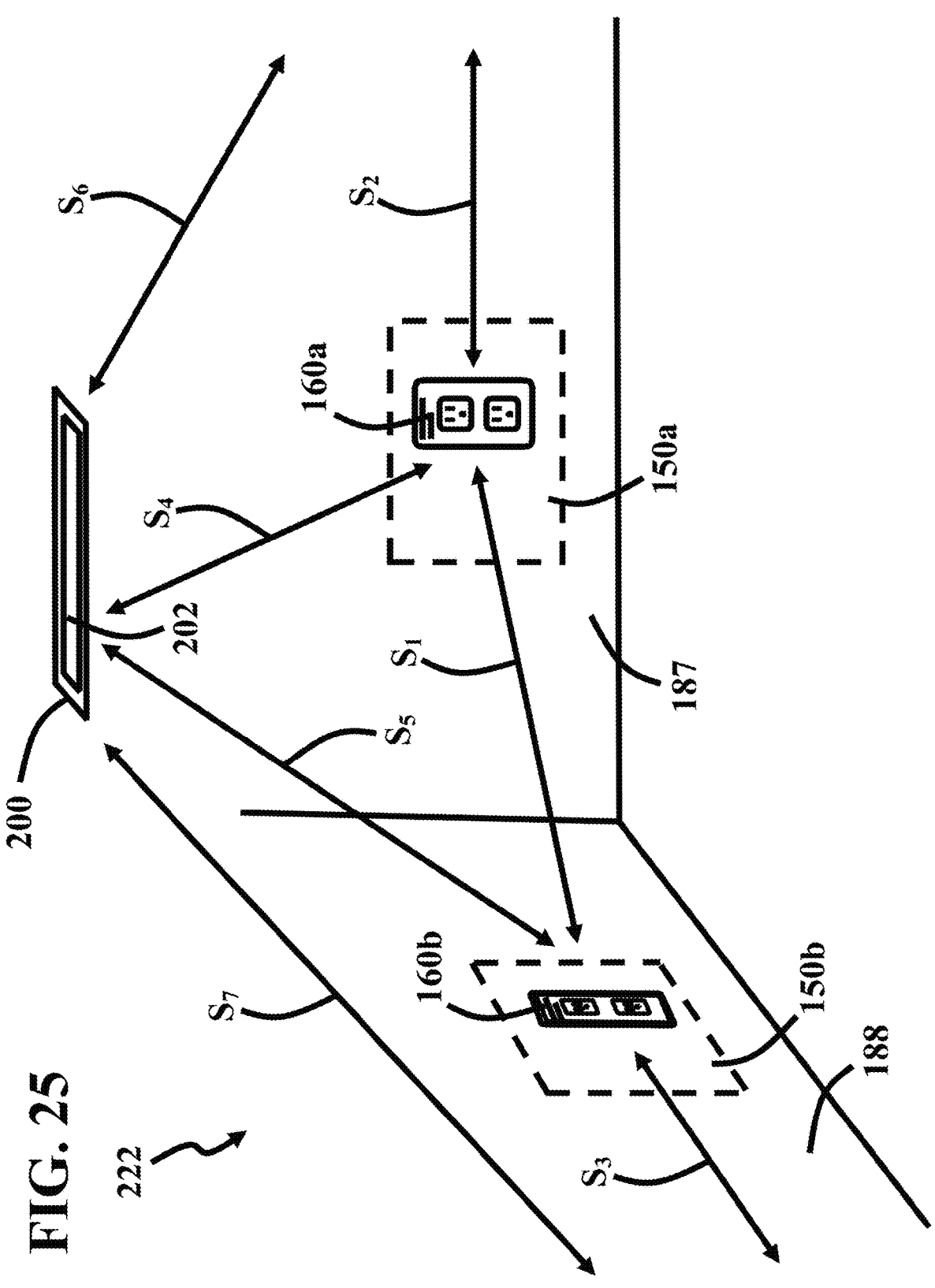
FIG. 25 is a perspective view of a sixth embodiment of a battery unit network.

FIG. 25 is a perspective view of a sixth embodiment of a battery unit network, denoted as battery unit network 222. In this embodiment, the battery unit network 222 includes the battery unit 150*a*, wherein the battery unit 150*a* includes the power outlet assembly 160*a*. As mentioned above, the battery unit 150*a* is the same as the battery unit 150 (FIGS. 7, 8, and 9), and includes the battery unit circuit 151 (FIGS. 10 and 11). Further, the power outlet assembly 160*a* corresponds to the power outlet assembly 160 (FIG. 9).

As mentioned above, the battery unit 150*a* extends through the wall member 187, wherein the wall member 187 is carried by the frame 180 (FIG. 8). Further, the power outlet assembly 160*a* extends through the wall member 187 (FIG. 9).

The battery unit network 222 includes the battery unit 150*b*, wherein the battery unit 150*b* includes the power outlet assembly 160*b*. In this embodiment, the battery unit 150*b* is the same as the battery unit 150 (FIGS. 7, 8, and 9), and includes the battery unit circuit 151 (FIGS. 10 and 11). Further, the power outlet assembly 160*b* corresponds to the power outlet assembly 160 (FIG. 9).

As mentioned above, the battery unit 150*b* extends through the wall member 188, wherein the wall member 188 is carried by the frame 180 (FIG. 8). Further, the power outlet assembly 160*b* extends through the wall member 188 (FIG. 9).

In this embodiment, the battery units 150*a* and 150*b* establish communication with each other so that the wireless signal $S_1$ can flow therebetween. As mentioned above, the wireless signal $S_1$ is used to coordinate charge and discharge sequences on the electrical distribution system to aggregate the available capacity of the distributed energy storage system. For example, the wireless signal $S_1$ can coordinate the discharge on the electrical distribution system between the battery units 150*a* and 150*b* to aggregate the available capacity between them.

The battery unit 150*a* can establish communication with the first remote device so that the wireless signal $S_2$ can flow therebetween. As mentioned above, the wireless signal $S_2$ is used to coordinate charge and discharge sequences on the electrical distribution system to aggregate the available capacity of the distributed energy storage system. For example, the wireless signal $S_2$ can coordinate the discharge on the electrical distribution system between the battery unit 150*a* and the first remote device to aggregate the available capacity between them.

The battery unit 150*b* can establish communication with a remote device so that the wireless signal $S_3$ can flow therebetween. As mentioned above, the wireless signal $S_3$ is used to coordinate charge and discharge sequences on the electrical distribution system to aggregate the available capacity of the distributed energy storage system. For example, the wireless signal $S_3$ can coordinate the discharge on the electrical distribution system between the battery unit 150*b* and the third remote device to aggregate the available capacity between them.

In this embodiment, the battery unit network 222 includes the light fixture 200 (FIG. 16), wherein the light fixture 200 includes the battery unit circuit 103 (FIGS. 20 and 21). In this embodiment, the battery unit 160*a* establishes communication with the light fixture 200 so that the wireless signal $S_4$ can flow therebetween. The wireless signal $S_4$ is used to coordinate a discharge on the electrical distribution system to aggregate the available capacity of the distributed energy storage system. For example, the wireless signal $S_4$ can coordinate the discharge on the electrical distribution system between the battery unit circuit 151 (FIGS. 10 and 11) of the battery unit 160*a* and the battery unit circuit 103 (FIGS. 20 and 21) of the light fixture 200 to aggregate the available capacity between them.

In this embodiment, the light fixture 200 can establish communication with the fourth remote device so that the wireless signal $S_6$ can flow therebetween. The wireless signal $S_6$ is used to coordinate charge and discharge sequences on the electrical distribution system to aggregate the available capacity of the distributed energy storage system. For example, the wireless signal $S_6$ can coordinate the discharge on the electrical distribution system between the battery unit circuit 103 and the fourth remote device to aggregate the available capacity between them.

In this embodiment, the battery unit 160*b* establishes communication with the light fixture 200 so that the wireless signal $S_5$ can flow therebetween. The wireless signal $S_5$ is used to coordinate a discharge on the electrical distribution system to aggregate the available capacity of the distributed energy storage system. For example, the wireless signal $S_5$ can coordinate the discharge on the electrical distribution system between the battery unit circuit 151 (FIGS. 10 and 11) of the battery unit 160*b* and the battery unit circuit 103 (FIGS. 20 and 21) of the light fixture 200 to aggregate the available capacity between them.

In this embodiment, the light fixture 200 can establish communication with the fifth remote device so that the wireless signal $S_7$ can flow therebetween. The wireless signal $S_7$ is used to coordinate charge and discharge sequences on the electrical distribution system to aggregate the available capacity of the distributed energy storage system. For example, the wireless signal $S_7$ can coordinate the discharge on the electrical distribution system between the battery unit circuit 103 and the fifth remote device to aggregate the available capacity between them.

It should be noted that the fourth and fifth remote devices can be of many different types, such as a computer, smart phone, and/or tablet. The fourth and fifth remote devices can also be a server, which operates a web-based portal or web-based interface. The fourth remote device can be a battery unit and a light fixture. For example, the fourth remote device can include the can light fixtures 210 (FIG. 17) and 215 (FIG. 19). Further, the fifth remote device can be a battery unit and a light fixture. For example, the fifth remote device can include the can light fixtures 210 (FIG. 17) and 215 (FIG. 19).

The invention disclosed above allows the distribution of energy through an array of battery units, wherein the distribution of energy can be controlled in a coordinated manner using a wireless network. The invention allows energy to be distributed, in a controlled manner, to other electrical devices through the electrical distribution system.

The battery units are easily installed by simply plugging them into corresponding electrical outlets. In some situations, such as new building construction, the battery units can be installed in a wall, if desired. The end user can easily add more battery capacity by plugging in more battery units to the available electrical outlets.

The battery units establish communication with each other so they coordinate the discharge on the electrical distribution system to aggregate the available capacity of the distributed energy storage system. The invention allows the energy flow through the distributed energy storage system to be monetized.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

In an example embodiment, the battery unit circuit 101 further comprises a processor (not shown). The processor may be configured to provide control signals to the inverter for controlling the inverter, and thus for controlling the charging and discharging of the battery cell. The processor may be any suitable computer chip, integrated circuit or the like. In an example embodiment, the processor may comprise or work in conjunction with a memory and/or a clock. The processor may provide these inverter control signals based on processor control signals provided from transceiver 109 (based on $S_{Control}$ signals received at transceiver 109). In other example embodiments, the processor may provide these inverter control signals based on pre-stored charge/discharge schedules, programming directly entered into a memory from an input device associated with the battery unit (key pad or the like), or programming indirectly entered into an electronic device and uploaded, for example via USB connection port or the like. Thus, in some embodiments, the battery unit may not comprise a transceiver, but two or more units connected to the same electrical system can be operated in coordination to charge or discharge at the same time or in coordination with one another.

In an example embodiment, an individual battery unit or the network of two or more battery units are controlled via a remote cloud based system. The remote cloud based system, in an example embodiment, configures the charge and discharge cycles for optimal energy savings by the customer. The individual battery unit, or a plurality of battery units, through an internet connection at each device, may receive instructions ($S_{Control}$ signals) for charging and discharging that are aligned with the customers current utility rate tariff to store less expensive electricity so it can be consumed during times of higher electricity prices. This control system in an example embodiment, is linked to the customer through a web portal that is accessible by any device with a web browser such as a mobile smart phone, desktop or other internet enabled device. The control of the local devices can also be manually configured by the customer via this web portal and instructions can be sent via the cloud.

The local devices may provide SData to one or more remote devices. In an example embodiment, the SData represents the charge status of the battery cell (charged, discharged, partial charge percentage, etc.). Moreover, the SData may represent any data obtained by the processor related to the battery cell.

In an example embodiment, the battery units are controlled via a remote cloud based system, which coordinates the charge and discharge cycles of multiple units so that their combined electricity storage capacity is additive. In an example embodiment, a plurality of battery units form a group of plug-in battery units (where plug-in can represent either a unit that plugs into a standard wall outlet assembly, or a luminaire that plugs/screws into a light fixture). The group of battery units are all controlled by a remote device, such as a server over an internet or the cloud. The group of battery units can be wirelessly coordinated to control the charge and discharge of the group of plug-in battery units.

In this example embodiment, each unit can be controlled individually, in aggregation for an individual customer, or in aggregation for a group of customers thereby forming a mesh network of devices that can be controlled collectively. In an example embodiment, a group of battery units may all be located in the same house, office, apartment, room, store, business, and/or the like. In this example embodiment, the group of battery units may all be owned by an individual customer (e.g., the homeowner or business owner or the entity paying the electric bill for that particular electric meter). Thus, all the battery units in the group may be located behind the same meter. In other example embodiments, the mesh network may comprise battery units in a neighborhood, zip code, geographic area, energy distribution area, behind multiple meters, owned by different entities, or any other suitable way of grouping multiple plug-in battery units. Thus, the battery units may be grouped geographically, in an example embodiment.

In the embodiment where the group of plug-in battery units are behind the same meter, the SControl signals may be based off of historical data, current time of use rates, for charging and discharging that are aligned with the customers current utility rate tariff to store less expensive electricity so it can be consumed during times of higher electricity prices, and/or the like. Thus, the electrical system in this embodiment may be the house electric system behind the meter. In the embodiment where the group of plug-in battery units are behind more than one meter, the SControl signals may be based off of historical data, grid services, demand response, open market energy trading rates, peak shaving, and/or the like. Thus, the electrical system in this embodiment may be the utility power grid. In an example embodiment, an energy trader looking ahead may bid for demand response in a geographic area, and provide power to fulfill that bid by turning on thousands of plug-in battery units at the same time in that geographic area. Thus, in some embodiments, the plug-in battery units are controlled for power management in-front of the meter where the plug-in battery units are plugged in, and in other embodiments, the plug-in battery units are controlled for power management behind the meter where the plug-in battery units are plugged in.

In an example embodiment, the battery unit is rated at less than or equal to 2400 Volt-Amperes (VA). In another example embodiment, the battery unit rated at less than or equal to 3000 VA. Thus, the battery unit size may, in various example embodiments, be sized such that a contractor need not be hire to install the battery unit, thus making the installation simple and inexpensive.

As noted herein, in various embodiments, the battery unit is controlled based on its geographic location. Thus, in an example embodiment, the battery unit registers its location in any suitable way, such as by the user providing the information on registration/enrollment, by global positioning, by input directly on the device, through use of the router's location, or any other suitable method. This location may be stored at the remote device, on the cloud, or otherwise.

What is claimed is:

1. A method of using a battery aggregating system to assist with an available capacity of a local grid, comprising:

receiving a set of grid data from the local grid;

determining, based on the set of grid data, whether the local grid needs a power withdrawal or a power supplementation, determining, based on an SData signal received wirelessly from a plurality of battery units, the available capacity of the battery aggregating system, the plurality of battery units located behind a single meter; and commanding, via an SControl signal transmitted to the plurality of battery units, a discharge state or a charge state for each of the plurality of battery units to aggregate the power withdrawal from the local grid or the power supplementation to the local grid, wherein each of the plurality of battery units discharge only while coupled to at least one of a wall outlet or a luminaire socket.

2. The method of claim 1, wherein the SControl signal is based off at least one of historical data, grid services, demand response, open market energy trading rates, and peak shaving.

3. The method of claim 1, wherein the plurality of battery units react to the power withdrawal or the power supplementation separate from a plurality of building operation equipment.

4. The method of claim 1, wherein the determining and the commanding is performed by one of the plurality of battery units.

5. The method of claim 1, wherein the determining and the commanding is performed by a remote device distinct from the plurality of battery units.

6. The method of claim 1, wherein the SData signal is transmitted over a network.

7. The method of claim 1, wherein the SControl signal is transmitted over a network.

8. The method of claim 1, wherein each battery unit in the plurality of battery units only charge or discharge at less than or equal to 2400 Volt-Amperes.

9. The method of claim 1, wherein the plurality of battery units and the local grid are in the same geographical region.

10. The method of claim 1, wherein the plurality of battery units are spaced apart from each other.

11. The method of claim 1, wherein each of the plurality of battery units are directly coupled to at least one of a wall outlet or a luminaire socket.

12. A battery aggregating system allowing aggregation of a local grid in response to execution by one or more processors, the one or more processors to perform operations comprising:

receiving, by the one or more processors and through a transceiver, an SData signal from a plurality of battery units;

determining, by the one or more processors, a discharge state of each of the plurality of battery units based on the SData signal from the plurality of battery units when the local grid is in high demand; and commanding, by the one or more processors and through the transceiver, the plurality of battery units to coordinate a discharge for each battery unit in the plurality of battery units to aggregate an available capacity of at least a subset of the plurality of battery units for discharge to the local grid, wherein each of the plurality of battery units discharge only while coupled to at least one of a wall outlet or a luminaire socket, wherein each of the plurality of battery units only charge or discharge at less than or equal to 2400 Volt-Amperes.

13. The battery aggregating system of claim 12, wherein the plurality of battery units are spaced apart from each other.

14. The battery aggregating system of claim 12, further comprising transmitting an SControl signal to each of the plurality of battery units in response to commanding the plurality of battery units to coordinate the discharge for each of the plurality of battery units.

15. The battery aggregating system of claim 14, wherein the SControl signal is transmitted over a network.

16. The battery aggregating system of claim 12, wherein the SData signal is transmitted over a network.

17. The battery aggregating system of claim 12, wherein at least one of the plurality of battery units is a luminaire.

18. The battery aggregating system of claim 12, wherein the determining and the commanding is performed by one or more of the plurality of battery units.

19. The battery aggregating system of claim 12, wherein the determining and the commanding is performed by a remote device distinct from the plurality of battery units.

20. The battery aggregating system of claim 12, wherein the plurality of battery units and the local grid are in the same geographical region.

* * * * *